(12) United States Patent
Smith et al.

(10) Patent No.: US 11,509,193 B2
(45) Date of Patent: Nov. 22, 2022

(54) POWER TOOL WITH COMPACT MOTOR ASSEMBLY

(71) Applicant: Black & Decker Inc., New Britain, CT (US)

(72) Inventors: David J. Smith, Columbia, MD (US); Justin H. Ayers, Jarrettsville, MD (US); Abraham Sanchez, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 17/123,870

(22) Filed: Dec. 16, 2020

(65) Prior Publication Data

US 2021/0194320 A1    Jun. 24, 2021

Related U.S. Application Data

(63) Continuation of application No. 17/123,644, filed on Dec. 16, 2020.

(60) Provisional application No. 62/950,409, filed on Dec. 19, 2019.

(51) Int. Cl.
| | |
|---|---|
| *H02K 11/215* | (2016.01) |
| *H02K 29/08* | (2006.01) |
| *H02K 7/14* | (2006.01) |
| *H02K 1/16* | (2006.01) |
| *H02K 1/2733* | (2022.01) |

(52) U.S. Cl.
CPC .............. *H02K 7/145* (2013.01); *H02K 1/16* (2013.01); *H02K 1/2733* (2013.01)

(58) Field of Classification Search
CPC ......... H02K 11/215; H02K 29/08; H02K 7/14
USPC .................................................. 310/50, 68 B
See application file for complete search history.

(56) References Cited

U.S. PATENT DOCUMENTS

| | | |
|---|---|---|
| 3,805,134 A | 4/1974 | Osamu et al. |
| 3,829,721 A | 8/1974 | Rosenthal |
| 3,881,243 A | 5/1975 | Bannon |
| 4,099,104 A | 7/1978 | Muller |
| 4,110,644 A | 8/1978 | Roddy |

(Continued)

FOREIGN PATENT DOCUMENTS

| | | | | |
|---|---|---|---|---|
| CN | 1575932 A | | 2/2005 | |
| CN | 104205584 A | * | 12/2014 | ........... H02K 11/215 |

(Continued)

OTHER PUBLICATIONS

EP EESR dated Jun. 8, 2021 in corresponding EP application No. 20215174.2.

(Continued)

*Primary Examiner* — Jose A Gonzalez Quinones
(74) *Attorney, Agent, or Firm* — Amir R. Rohani

(57) ABSTRACT

A brushless direct-current (BLDC) motor is provided with a stator assembly including a stator core and stator windings wound around stator teeth, a rotor shaft extending along a longitudinal axis, and a rotor including a rotor core mounted on the rotor shaft supporting at least one permanent magnet. A circuit board is provided including a main body and at least one leg radially projecting from the main body to support at least one magnetic sensor near the permanent magnet. The leg of the circuit board oriented along a radial plane that intersects the stator windings.

20 Claims, 31 Drawing Sheets

(56) References Cited

U.S. PATENT DOCUMENTS

| | | |
|---|---|---|
| 4,333,026 A | 6/1982 | Bock et al. |
| 4,429,263 A | 1/1984 | Mueller |
| 4,482,849 A | 11/1984 | Doemen et al. |
| 4,535,262 A | 8/1985 | Newberg |
| 4,547,714 A | 10/1985 | Mueller |
| 4,682,066 A | 7/1987 | Abbratozzato et al. |
| 4,791,328 A | 12/1988 | Lakin |
| 4,793,054 A | 12/1988 | Abbratozzato et al. |
| 4,908,538 A | 3/1990 | Geberth |
| 5,148,069 A | 9/1992 | Nonaka et al. |
| 5,402,025 A | 3/1995 | Saito et al. |
| 5,528,095 A | 6/1996 | Strobl |
| 5,679,990 A | 10/1997 | Ushiro |
| 5,731,648 A | 3/1998 | Gaughan et al. |
| 5,738,177 A | 4/1998 | Schell et al. |
| 5,808,390 A | 9/1998 | Miyazawa et al. |
| 5,898,990 A | 5/1999 | Henry |
| 6,166,470 A | 12/2000 | Miyazawa et al. |
| 6,274,957 B1 | 8/2001 | Mahn et al. |
| 6,394,191 B1 | 5/2002 | Nakane |
| 6,474,114 B1 | 11/2002 | Ito et al. |
| 6,509,668 B2 | 1/2003 | Berger |
| 6,628,021 B2 | 9/2003 | Shinohara et al. |
| 6,719,067 B2 | 4/2004 | Taga |
| 7,012,346 B2 | 3/2006 | Hoffman et al. |
| 7,048,075 B2 | 5/2006 | Saito et al. |
| 7,080,696 B2 | 7/2006 | Soika et al. |
| 7,131,503 B2 | 11/2006 | Furuta et al. |
| 7,372,181 B2 | 5/2008 | Kinashi et al. |
| 7,455,121 B2 | 11/2008 | Saito et al. |
| 7,562,542 B2 | 7/2009 | Choi |
| 7,588,095 B2 | 9/2009 | Puzio et al. |
| 7,598,636 B2 | 10/2009 | Nakamura |
| 7,723,877 B2 | 5/2010 | Hiwaki et al. |
| 7,768,168 B2 | 8/2010 | Aschoff et al. |
| 7,845,427 B2 | 12/2010 | Wan et al. |
| 7,918,286 B2 | 4/2011 | Nagasaka et al. |
| 8,040,015 B2 | 10/2011 | Zaps |
| 8,049,382 B2 | 11/2011 | Nakagawa et al. |
| 8,069,929 B2 | 12/2011 | Sugimoto et al. |
| 8,169,112 B2 | 5/2012 | Zhang |
| 8,278,803 B2 | 10/2012 | Lin et al. |
| 8,283,841 B2 | 10/2012 | Lin et al. |
| 8,698,363 B2 | 4/2014 | Utsumi et al. |
| 8,760,013 B2 | 6/2014 | Esenwein |
| 9,114,521 B2 | 8/2015 | Yoshikawa |
| 9,308,638 B2 | 4/2016 | Kondo et al. |
| 9,450,472 B2 | 9/2016 | Hatfield et al. |
| 9,616,558 B2 | 4/2017 | Nishikawa et al. |
| 9,643,300 B2 | 5/2017 | Kumagai et al. |
| 9,755,490 B2 | 9/2017 | Inuzuka |
| 9,868,201 B2 | 1/2018 | Kamiya |
| 9,869,327 B2 | 1/2018 | Kodato et al. |
| 9,948,162 B2 | 4/2018 | Nagahama et al. |
| RE46,827 E | 5/2018 | Rudolph et al. |
| 10,056,806 B2 | 8/2018 | Hatfield et al. |
| 10,075,048 B2 | 9/2018 | Jeong et al. |
| 10,093,487 B2 | 10/2018 | Ramezani |
| 10,205,365 B2 | 2/2019 | Beyerl et al. |
| 10,213,907 B2 | 2/2019 | Kumagai et al. |
| 10,213,912 B2 | 2/2019 | Kumagai et al. |
| 10,236,742 B2 | 3/2019 | Smith et al. |
| 10,245,711 B2 | 4/2019 | Nagasaka |
| 10,348,158 B2 | 7/2019 | Niwa et al. |
| 10,385,863 B2 | 8/2019 | Hidaka et al. |
| 10,432,065 B2 | 10/2019 | Milwaukee |
| 2003/0107273 A1 | 6/2003 | Ikeda et al. |
| 2004/0124727 A1 | 7/2004 | Lau |
| 2004/0211576 A1 | 10/2004 | Milbourne et al. |
| 2006/0055270 A1* | 3/2006 | Petersen ............... H02K 3/28 310/156.05 |
| 2011/0083869 A1 | 4/2011 | Lin |
| 2011/0152029 A1 | 6/2011 | Rudolph et al. |
| 2013/0008680 A1 | 1/2013 | Nagasaka et al. |
| 2013/0205604 A1 | 8/2013 | Esenwein et al. |
| 2013/0207491 A1 | 8/2013 | Hatfield et al. |
| 2013/0313926 A1 | 11/2013 | Bekavac et al. |
| 2014/0182869 A1 | 7/2014 | Kumagai et al. |
| 2014/0190717 A1 | 7/2014 | Simpson |
| 2014/0251649 A1 | 9/2014 | Kondo |
| 2014/0251650 A1 | 9/2014 | Kondo |
| 2015/0041169 A1 | 2/2015 | Kumagai et al. |
| 2015/0061441 A1 | 3/2015 | Figgins et al. |
| 2015/0303777 A1 | 10/2015 | Osborne et al. |
| 2016/0149463 A1 | 5/2016 | Smith et al. |
| 2016/0336838 A1 | 11/2016 | Makita |
| 2016/0354911 A1 | 12/2016 | Aoki et al. |
| 2016/0380510 A1* | 12/2016 | Niwa ................. H02K 3/522 310/50 |
| 2017/0144278 A1 | 5/2017 | Nishikawa et al. |
| 2017/0259412 A1 | 9/2017 | Nishikawa et al. |
| 2017/0288499 A1 | 10/2017 | Beyerl et al. |
| 2017/0294819 A1 | 10/2017 | Crosby et al. |
| 2017/0317548 A1 | 11/2017 | Suzuki et al. |
| 2017/0326720 A1 | 11/2017 | Kuroyanagi et al. |
| 2018/0015602 A1 | 1/2018 | Machida |
| 2018/0152062 A1 | 5/2018 | Chang et al. |
| 2018/0222022 A1 | 8/2018 | Kumagai et al. |
| 2019/0074751 A1 | 3/2019 | Chen |
| 2019/0118352 A1 | 4/2019 | Weber et al. |
| 2019/0134800 A1 | 5/2019 | Kumagai et al. |
| 2019/0140516 A1 | 5/2019 | Beyerl et al. |
| 2019/0143491 A1 | 5/2019 | Kumagai et al. |
| 2019/0157929 A1 | 5/2019 | Cho et al. |
| 2019/0160636 A1 | 5/2019 | Hirabayashi et al. |
| 2019/0173349 A1 | 6/2019 | Smith et al. |
| 2019/0255687 A1 | 8/2019 | Schneider et al. |
| 2019/0260245 A1 | 8/2019 | Chamand et al. |
| 2019/0262978 A1 | 8/2019 | Tejima et al. |
| 2019/0273421 A1 | 9/2019 | Velderman et al. |
| 2019/0280560 A1 | 9/2019 | Niwa et al. |

FOREIGN PATENT DOCUMENTS

| | | | |
|---|---|---|---|
| CN | 207588668 U | 7/2018 | |
| CN | 108462350 A * | 8/2018 | ............. B25D 11/06 |
| EP | 1690637 A1 | 8/2006 | |
| EP | 1912315 A2 | 12/2008 | |
| EP | 3035508 A2 | 6/2016 | |
| EP | 3229350 A1 | 10/2017 | |
| EP | 2251148 B1 | 11/2017 | |
| EP | 3163718 B1 | 9/2018 | |
| EP | 3534504 A1 | 9/2019 | |
| GB | 2418544 B | 8/2006 | |
| JP | H0775295 A | 3/1995 | |
| JP | 2005045917 A | 2/2005 | |
| JP | 2007330030 A | 12/2007 | |
| JP | 2008267519 A | 11/2008 | |
| JP | 2016151290 A | 8/2016 | |
| KR | 20160110157 A * | 9/2016 | |
| KR | 101830159 B1 | 2/2018 | |
| WO | WO-9919942 A1 * | 4/1999 | ......... H01R 12/7052 |
| WO | WO09919942 A1 * | 10/1999 | |
| WO | 2014048453 | 4/2014 | |
| WO | 2015150702 A2 | 10/2015 | |
| WO | 2015150702 A3 | 10/2015 | |
| WO | 2017173075 A1 | 10/2017 | |

OTHER PUBLICATIONS

EP EESR dated Jun. 14, 2021 in corresponding EP application No. 20215172.6.

EP EESR dated Jun. 15, 2021 in corresponding EP application No. 20215177.5.

* cited by examiner

POWER TOOL WITH COMPACT MOTOR ASSEMBLY

RELATED APPLICATION

This application is a continuation of U.S. patent application Ser. No. 17/123,644 filed on Dec. 16, 2020, and it claims the benefit of U.S. Provisional Patent Application No. 62/950,409 filed Dec. 19, 2019, content of which is incorporated herein by reference in its entirety.

FIELD

This disclosure relates to a power tool, such as an impact driver or impact wrench, with a compact motor assembly, such as a low-profile and compact brushless motor assembly.

BACKGROUND

Power tools such as impact drivers and impact wrenches may be used for driving threaded fasteners into workpieces. Such power tools may lack sufficient power to drive a threaded fastener into a workpiece or may be too large in length or girth to fit into a desired location. In such power tools, it is desirable to reduce the girth and/or length of the tool, including the motor assembly and related components, without sacrifice power performance.

SUMMARY

In a first aspect, a power tool includes a housing having a rearward end portion and a forward end portion and a brushless motor received in the housing. The motor includes a rotor configured to rotate about a rotor axis and a stator assembly having a stator core and conductive windings. The motor defines a motor envelope bounded by a rear plane at a rearmost point of the stator assembly and the rotor, a front plane at a frontmost point of the stator assembly and the rotor, and a generally cylindrical boundary extending from the rear plane to the front plane and surrounding a radially outermost portion of the stator assembly and the rotor. A rotor shaft extends along the rotor axis and is coupled to and configured to be rotatably driven by rotation of the rotor. A transmission is received in the housing and includes an input member coupled to and configured to be rotatably driven by rotation of the rotor shaft, and an output member configured to be driven by rotation of the input member. A first bearing is configured to support the rotor shaft and is at least partially received within the motor envelope. A second bearing is configured to support a component of the transmission and is at least partially received within the motor envelope.

In a second aspect, a power tool includes a housing having a rearward end portion and a forward end portion and a brushless motor received in the housing. The motor includes a rotor configured to rotate about a rotor axis and a stator assembly having a stator core and conductive windings. A rotor shaft extends along the rotor axis and is coupled to and configured to be rotatably driven by rotation of the rotor. A transmission is received in the housing and includes an input member coupled to and configured to be rotatably driven by rotation of the rotor shaft. An output member is configured to be driven by rotation of the input member. A first bearing is configured to support the rotor shaft and at least partially nested inside the stator assembly. A second bearing is configured to support a component of the transmission and at least partially nested inside the stator assembly.

Implementations of the first and second aspects may include one or more of the following features. The stator may at least partially surround the rotor. The input member may comprise a gear rotatably driven by the rotor shaft. The transmission may comprise a planetary gear set with the input member including a sun gear rotatably driven by the rotor shaft, the output member including a carrier, and the planetary gear set further including a planet gear rotatably mounted to the carrier and meshed with the sun gear and a ring gear meshed with the planet gear and held non-rotatably relative to the housing. The second bearing may be configured to support the carrier. The second bearing may be configured to support the sun gear. The second bearing may be configured to support the output member and may further comprise a third bearing configured to support the rotor shaft. The rearward end portion of the housing may include a rear cap defining a recess and the third bearing may be disposed at least partially in the recess. A fan may be coupled to the rotor shaft. The fan may be disposed between the stator and the rear end wall. The fan may include a hub and a vane portion extending radially outward from the hub. The hub may be at least partially received in the stator assembly.

A support plate may be configured to support at least a portion of the transmission and held non-rotatably relative to the housing. The support plate may include a nested portion at least partially received within the motor envelope. The nested portion of the support plate may support the first bearing. The nested portion of the support plate may support the second bearing. The nested portion of the support plate may include a rearward projection of the support plate. The nested portion may be at least partially received within the stator. The nested portion may be at least partially received within a recess in the rotor. The first bearing may be nested at least partially within at least a portion of the rotor. The rotor may define a central recess and the first bearing may be received at least partially within the recess.

An output spindle may have a front end proximal a front end portion of the housing and a rotational impact mechanism coupled to the output member of the transmission and to the output spindle. The impact mechanism may be configured to transmit continuous rotary motion without impacts from the transmission to the output spindle when a torque on the output spindle does not exceed a transition torque, and to transmit rotational impacts from the motor to the output spindle when a torque on the output spindle exceeds the transition torque. The mechanism may include a cam shaft extending forward from the output member, a hammer received over the cam shaft and configured to move axially and rotationally relative to the cam shaft, a spring disposed between the hammer and the output member and configured to bias the hammer away from the cam shaft, and an anvil coupled to the output spindle, the hammer configured to transmit continuous rotary motion to the anvil when the torque on the output spindle does not exceed a transition torque and the hammer configured to apply rotational impacts to the anvil when the torque on the output spindle exceeds a transition torque.

The power tool may have a maximum power output of at least 430 Watts and a length of the tool from a rear end of the housing to a front end of the output spindle of less than or equal to 110 mm. A ratio of the maximum power output of the motor to the length of the tool may be at least 4.5 Watts/mm. The power tool may have a maximum output torque of at least 1820 inch-pounds and a length of the tool from a rear end of the housing to a front end of the output spindle is less than or equal to 110 mm. A ratio of the maximum output torque of the tool to the length of the tool may be at least 18.0 inch-pounds/mm.

In a third aspect, a power tool includes a housing having a rearward end portion, a forward end portion, and defining a tool axis. A brushless motor is received in the housing. The motor includes a rotor configured to rotate about a rotor axis and a stator assembly having a stator core and conductive windings. A rotor shaft extends along the rotor axis and is configured to be rotatably driven by rotation of the rotor. A transmission is received in the housing and includes an input member configured to be rotatably driven by rotation of the rotor shaft and an output member configured to be driven by rotation of the input member. An output spindle has a front end proximate the front end portion of the housing. A rotational impact mechanism is coupled to the output member of the transmission and to the output spindle. The impact mechanism is configured to transmit continuous rotary motion without impacts from the transmission to the output spindle when a torque on the output spindle does not exceed a transition torque, and to transmit rotational impacts from the motor to the output spindle when a torque on the output spindle exceeds the transition torque. A ratio of maximum power output to a length of the tool from a rear end of the housing to a front end of the output spindle is at least 4.5 Watts/mm.

In a fourth aspect, a power tool includes a housing having a rearward end portion, a forward end portion, and defining a tool axis. A brushless motor is received in the housing. The motor includes a rotor configured to rotate about a rotor axis and a stator assembly having a stator core and conductive windings. A rotor shaft extends along the rotor axis and is configured to be rotatably driven by rotation of the rotor. A transmission is received in the housing and includes an input member configured to be rotatably driven by rotation of the rotor shaft and an output member configured to be driven by rotation of the input member. An output spindle has a front end proximate the front end portion of the housing. A rotational impact mechanism is coupled to the output member of the transmission and to the output spindle. The impact mechanism is configured to transmit continuous rotary motion without impacts from the transmission to the output spindle when a torque on the output spindle does not exceed a transition torque, and to transmit rotational impacts from the motor to the output spindle when a torque on the output spindle exceeds the transition torque. A ratio of a maximum output torque of the tool to a length of tool from a rear end of the housing to a front end of the output spindle is at least 18.0 inch-pounds/mm.

Implementations of the third and fourth aspects may include one or more of the following features. The stator may at least partially surround the rotor. The input member may comprise a gear rotatably driven by the rotor shaft. The transmission may comprise a planetary gear set with the input member including a sun gear rotatably driven by the rotor shaft, the output member including a carrier, and the planetary gear set further including a planet gear rotatably mounted to the carrier and meshed with the sun gear and a ring gear meshed with the planet gear and held non-rotatably relative to the housing. A first bearing may be configured to support the motor output shaft and may be at least partially nested within the stator assembly. A second bearing may be configured to support at least one of the rotor shaft and a portion of the transmission. At least a portion of the second bearing may be nested within the stator assembly. The second bearing may be configured to support the rotor shaft. A third bearing may be configured to support the input member of the transmission. The second bearing may be configured to support the input member of the transmission. The third bearing may be configured to support the rotor shaft. The third bearing may be positioned rearward of the stator. The housing may include a rear end wall with a recess and the third bearing may be disposed at least partially in the recess.

A fan may be coupled to the rotor shaft. The fan may be disposed between the stator and the rear end cap. The rotor may define a central recess and the first bearing may be received at least partially within the recess. A support plate may be configured to support at least a portion of the transmission and held non-rotatably relative to the housing. The support plate may be at least partially received within the stator. The support plate may support a first bearing that supports the rotor shaft and a second bearing that supports at least one of the rotor shaft and a portion of the transmission. The support plate may have a rearward projection that is at least partially received within a recess in the rotor.

The impact mechanism may include a cam shaft extending forward from the output member, a hammer received over the cam shaft and configured to move axially and rotationally relative to the cam shaft, a spring disposed between the hammer and the output member and configured to bias the hammer away from the cam shaft, and an anvil coupled to the output spindle, the hammer configured to transmit continuous rotary motion to the anvil when the torque on the output spindle does not exceed a transition torque and the hammer configured to apply rotational impacts to the anvil when the torque on the output spindle exceeds a transition torque. The power tool may have a maximum power output of at least 430 Watts and a length of the tool from a rear end of the housing to a front end of the output spindle may be less than or equal to 110 mm. The power tool may have a maximum output torque of at least 1820 inch-pounds and a length of the tool from a rear end of the housing to a front end of the output spindle of less than or equal to 110 mm.

In a fifth aspect, a power tool includes a housing having a rear end portion and a front end portion and a brushless motor received in the housing. The motor includes a rotor configured to rotate about a rotor axis and a stator assembly having a stator core and conductive windings. The motor defines a motor envelope bounded by a rear plane at a rearmost point of the stator assembly and the rotor, a front plane at a frontmost point of the stator assembly and the rotor, and a generally cylindrical boundary extending from the rear plane to the front plane and surrounding a radially outermost portion of the stator assembly and the rotor. A rotor shaft extends along the rotor axis and is coupled to and configured to be rotatably driven by rotation of the rotor. A transmission is received in the housing and includes an input member configured to be rotatably driven by rotation of the rotor shaft, and an output member configured to be driven by rotation of the input member. A support plate is configured to support at least a portion of the transmission, where the support plate is held non-rotatably relative to the housing and has a rearward portion at least partially received within the motor envelope.

In a sixth aspect, a power tool includes a housing having a rear end portion and a front end portion and a brushless motor received in the housing. The motor includes a rotor configured to rotate about a rotor axis and a stator assembly having a stator core and conductive windings. A rotor shaft extends along the rotor axis and is coupled to and configured to be rotatably driven by rotation of the rotor. A transmission is received in the housing and includes an input member configured to be rotatably driven by rotation of the rotor shaft, and an output member configured to be driven by rotation of the input member. A support plate is configured to support at least a portion of the transmission, where the support plate is held non-rotatably relative to the housing and has a rearward portion at least partially nested within the stator assembly.

In a seventh aspect, a power tool includes a power tool includes a housing having a rear end portion and a front end portion and a brushless motor received in the housing. The motor includes a rotor configured to rotate about a rotor axis and a stator assembly having a stator core and conductive windings. A rotor shaft extends along the rotor axis and is coupled to and configured to be rotatably driven by rotation of the rotor. A transmission is received in the housing and includes an input member configured to be rotatably driven by rotation of the rotor shaft, and an output member configured to be driven by rotation of the input member. A support plate is configured to support at least a portion of the transmission, where the support plate is held non-rotatably relative to the housing and has a rearward portion at least partially received within the rotor.

Implementations of the fifth, sixth, and seventh aspects may include one or more of the following features. The stator may at least partially surround the rotor. The input member may comprise a gear rotatably driven by the rotor shaft. A first bearing may be configured to support the rotor shaft and a second bearing may be configured to support one of the rotor shaft and a portion of the transmission. Each of the first bearing and the second bearing may be at least partially received in the stator assembly. The transmission may include a planetary gear set with the input member including a sun gear rotatably driven by the rotor shaft, the output member including a carrier, and the planetary gear set further including a planet gear rotatably mounted to the carrier and meshed with the sun gear and a ring gear meshed with the planet gear and held non-rotatably relative to the housing.

The second bearing may be configured to support the carrier. The second bearing is may be configured to support the sun gear. The second bearing may be configured to support the rotor shaft. The second bearing may be configured to support the output member of the transmission. A third bearing may be configured to support the rotor shaft. The rearward end portion of the housing may include a rear cap defining a recess and the third bearing may be disposed at least partially in the recess. A fan may be coupled to the rotor shaft. The fan may be disposed between the stator and the rear end wall. The fan may include a hub and a vane portion extending radially outward from the hub, the hub being at least partially received in the stator assembly. The first bearing may be nested at least partially within at least a portion of the rotor. The rotor may define a central recess and the first bearing may be received at least partially within the recess.

An output spindle may have a front end proximal a front end portion of the housing and a rotational impact mechanism coupled to the output member of the transmission and to the output spindle. The impact mechanism may be configured to transmit continuous rotary motion without impacts from the transmission to the output spindle when a torque on the output spindle does not exceed a transition torque, and to transmit rotational impacts from the motor to the output spindle when a torque on the output spindle exceeds the transition torque. The impact mechanism may include a cam shaft extending forward from the output member, a hammer received over the cam shaft and configured to move axially and rotationally relative to the cam shaft, a spring disposed between the hammer and the output member and configured to bias the hammer away from the cam shaft, and an anvil coupled to the output spindle, the hammer configured to transmit continuous rotary motion to the anvil when the torque on the output spindle does not exceed a transition torque and the hammer configured to apply rotational impacts to the anvil when the torque on the output spindle exceeds a transition torque.

The power tool may have a maximum power output of at least 430 Watts and a length of the tool from a rear end of the housing to a front end of the output spindle may be less than or equal to 110 mm. a ratio of the maximum power output of the motor to the length of the tool may be at least 4.5 Watts/mm. The power tool may have a maximum output torque of at least 1820 inch-pounds and a length of the tool from a rear end of the housing to a front end of the output spindle of less than or equal to 110 mm. A ratio of the maximum output torque of the tool to the length of the tool is at least 18.0 inch-pounds/mm.

Advantages may include one or more of the following. At least a portion of each of a motor bearing and a second bearing that supports a portion of the transmission or the rotor shaft is received in the motor envelope and at least partially nested within the stator assembly, reducing the overall length of the power tool along the tool axis. Also, at least a portion of at least one of the motor bearings and/or the transmission bearing is received in and nested within the rotor, reducing the overall length of the power tool. In addition, at least a portion of the support plate 130 is received in and nested within the stator assembly and the rotor, reducing the overall length of the power tool. At the same time, the power tool may be configured to produce a maximum power output of at least approximately 450 Watts and a maximum output torque of at least approximately 1800 inch-pounds. Thus, the power tool is able to produce much greater power and torque than would be expected in an impact power tool of comparable size (e.g., a ratio of power output to tool length of at least approximately 4.5 Watts/mm and/or a ratio of output torque to tool length of at least approximately 18.0 inch-pounds/mm. These and other features and advantages will become apparent and within the scope of this application.

According to an aspect of this disclosure, a power tool is provided including a tool housing, a support plate provided within the tool housing, a rear tool cap mounted on a rear end of the tool housing. and a brushless direct-current (BLDC) motor received within the housing. The BLDC motor includes a stator assembly including a stator core, stator teeth radially extending from the stator core and defining slots therebetween, and stator windings wound around the stator teeth. The BLDC motor further includes a rotor shaft extending along a longitudinal axis, a front motor bearing mounted on the rotor shaft and supported by the support plate, a rear motor bearing mounted on the rotor shaft and supported by the rear tool cap, and a rotor. The rotor includes a rotor core mounted on the rotor shaft within the stator assembly and a magnet ring mounted around the rotor core. The rotor core defines an annular recess within which at portion of the front bearing and a portion of the support plate are located such that the a radial plane intersects the front bearing, the magnet ring, and the stator core.

In an embodiment, the magnet ring includes a sintered permanent magnet.

In an embodiment, rotor core includes at least two alignment rings on an outer surface thereof defining one or more annular grooves therebetween. In an embodiment, an adhesive is provided within the annular grooves to secure the magnet ring to the rotor core.

In an embodiment, the rotor core includes at least two axial pads on an outer surface thereof defining one or more axial channels therebetween. In an embodiment, an adhesive is provided within the axial channels to secure the magnet ring to the rotor core.

In an embodiment, the support plate includes a radial wall provided adjacent the stator assembly, a bearing pocket formed at a center portion of the radial wall to receive the front motor bearing, and a stator piloting feature extending from the radial wall to engage a portion of the stator assembly to radially support the support plate relative to the stator assembly.

In an embodiment, the stator piloting feature includes axial posts axially extending from the radial wall around the bearing pocket into the slots of the stator assembly in engagement with at least one of the stator core or tip portions of the stator teeth to radially support the support plate relative to the stator assembly.

In an embodiment, a transmission assembly is disposed forward of the BLDC motor, and the support plate includes a radial wall provided adjacent the stator assembly, a first bearing pocket formed at a center portion of a first surface of the radial wall received within the annular recess of the rotor core and configured to receive the front motor bearing, and a second bearing pocket formed on a second surface of the radial wall facing the transmission assembly and configured to receive a component of the transmission assembly.

In an embodiment, the BLDC motor further includes a terminal block arranged on an outer surface of the stator core intersecting the radial plane, the terminal block including terminals each extending parallel to the longitudinal axis and each including a tang portion to which at least one of the stator windings is connected.

In an embodiment, the BLDC motor further includes a circuit board on which at least one magnetic sensor is mounted to magnetically sense the magnet ring, where the circuit board is oriented along a second radial plane that intersects the stator windings.

In an embodiment, a fan is mounted on the rotor shaft, and an inner portion of the fan is recessed to allow the rear bearing to be radially aligned with at least a portion of the fan.

In an embodiment, the rear tool cap includes a radial body that includes a central bearing pocket arranged to receive the rear motor bearing, a peripheral portion extending form the radial body arranged to be mate with the tool housing, and at least one constraining member projecting from the radial body to engage the stator assembly and radially secure the stator assembly relative to the rear tool cap independently of the tool housing.

In an embodiment, the rear tool cap is integrally formed as a part of the tool housing.

According to another aspect of this disclosure, a brushless direct-current (BLDC) motor is provided including a stator assembly. The stator assembly includes a stator core, stator teeth radially extending from the stator core and defining slots therebetween, and stator windings wound around the stator teeth. The motor further includes a rotor shaft that extends along a longitudinal axis and a rotor including a rotor core mounted on the rotor shaft, a permanent magnet ring mounted on an outer surface of the rotor core, and an adhesive material disposed between the rotor core and the permanent magnet ring. The rotor core includes a first portion having an outer diameter that substantially corresponds to an inner diameter of the permanent magnet ring to allow the first portion of the rotor core to be form-fittingly received within the permanent magnet ring in direct contact therewith and to radially secure the permanent magnet ring to the stator core, and a second portion having an outer diameter that is smaller than the inner diameter of the permanent magnet ring. The adhesive material is disposed between the second portion of the rotor core and the permanent magnet ring to axially secure the permanent magnet ring to the stator core.

In an embodiment, the first portion of the rotor core includes at least two annular alignment rings and the second portion of the rotor core includes at least one annular groove formed between the at least two annular alignment rings. In an embodiment, the adhesive material is disposed within the annular groove.

In an embodiment, the first portion of the rotor core includes at least one annular axial pad and the second portion of the rotor core includes at least one axial channel. In an embodiment, the adhesive material is disposed within the at least one axial channel.

In an embodiment, the permanent magnet ring includes a sintered magnet.

In an embodiment, the rotor core defines an annular recess within which at portion of a bearing of the rotor shaft is located.

In an embodiment, the rotor core includes uniformly shaped laminations bonded together and shaped to form the first portion and the second portion of the rotor core.

In an embodiment, the rotor core includes a first set of laminations shaped to form the first portion of the rotor core and a second set of laminations shaped to form the second portion of the rotor core.

In an embodiment, a power tool is provided including a tool housing a brushless direct-current (BLDC) motor as described above received within the housing.

According to another embodiment, a brushless direct-current (BLDC) motor is provided including a stator assembly. The stator assembly includes a stator core, stator teeth radially extending from the stator core and defining slots therebetween, and stator windings wound around the stator teeth. The motor further includes a rotor shaft that extends along a longitudinal axis and a rotor including a rotor core mounted on the rotor shaft, a permanent magnet ring mounted on an outer surface of the rotor core, and an adhesive material disposed between the rotor core and the permanent magnet ring. In an embodiment, the rotor core includes annular grooves formed in the outer surface within which the adhesive material is disposed to axially secure the permanent magnet ring to the stator core.

In an embodiment, the rotor core has an outer diameter that substantially corresponds to an inner diameter of the permanent magnet ring to allow the rotor core to be form-fittingly received within the permanent magnet ring in direct contact therewith and to radially secure the permanent magnet ring to the stator core.

In an embodiment, the rotor core has an outer diameter that is smaller than an inner diameter of the permanent magnet ring to form a gap within which the adhesive material is received.

In an embodiment, a power tool provided including a tool housing and a BLDC motor as described disposed within the housing.

According to another aspect of this disclosure, a brushless direct-current (BLDC) motor is provided including a stator assembly including a stator core, stator teeth radially extending from the stator core and defining slots therebetween, and stator windings wound around the stator teeth; a rotor shaft extending along a longitudinal axis; and a rotor including a rotor core mounted on the rotor shaft. The rotor core supports at least one permanent magnet that magnetically interacts with the stator windings to cause a rotation of the rotor relative to the stator assembly. A circuit board is provided having a main body and at least one leg radially projecting from the main body to support at least one magnetic sensor in close proximity to the at least one permanent magnet. In an embodiment, the leg is oriented along a radial plane that intersects the stator windings.

In an embodiment, the stator assembly further includes an end insulator mounted on an end surface of the stator core to insulate the stator core from the stator windings. In an embodiment, the circuit board is mounted and fastened to the end insulator.

In an embodiment, the circuit board at least three legs radially projecting from the main body to support three magnetic sensors. In an embodiment, each leg extends between two adjacent stator windings in the direction of the rotor towards a center of the stator assembly.

In an embodiment, each of the three magnetic sensors is substantially circumferentially aligned with inner portions of the stator windings.

In an embodiment, the main body of the circuit board includes a first portion that is curved and extends along the end of the stator assembly but does not extend peripherally beyond an outer surface of the stator core, and a second portion that extends peripherally beyond the outer surface of the stator core and through which at least one fastener is provided to secure the circuit board to the end insulator.

In an embodiment, a connector is mounted on the second portion of the main body of the circuit board and signal wires are coupled to the connector.

In an embodiment, the fastener is peripherally provided beyond the outer surface of the stator core.

In an embodiment, a retention feature provided on the first portion of the main body of the circuit board and arranged to make a mechanical connection with a portion of the end insulator, wherein no portion of the retention feature projects over a rear surface of the circuit board in a direction opposite the stator core.

In an embodiment, the second portion covers an angular distance in the range of approximately 60 degrees to 90 degrees.

In an embodiment, the first portion is provided within a part of the main body of the circuit board that covers an angular distance in the range of approximately 35 degrees to 55 degrees.

In an embodiment, inner tips of the three legs of the circuit board are circumferentially aligned with inner ends of the stator teeth.

In an embodiment, overmold or glue material is arranged to secure the inner tips of the three legs of the circuit board to inner teeth portions of the end insulator.

According to another aspect of the disclosure, a brushless direct-current (BLDC) motor is provided including a rotor shaft extending along a longitudinal axis, a stator assembly, and a rotor. The stator assembly includes a stator core, stator teeth radially extending from the stator core and defining slots therebetween, stator windings wound around the stator teeth, and an end insulator mounted on an end surface of the stator core to insulate the stator core from the stator windings, the end insulator having a radial body and a retention post projecting from the radial body. The rotor includes a rotor core mounted on the rotor shaft, the rotor core supporting at least one permanent magnet that magnetically interacts with the stator windings to cause a rotation of the rotor relative to the stator assembly. In an embodiment, a circuit board is mounted to the end insulator, the circuit board including a front surface facing the end insulator, a rear face, and at least one magnetic sensor mounted on the front face and configured to generate a signal associated with an angular position of the rotor. A retention feature is provided on a front surface of the circuit board facing the stator core and arranged to make a mechanical connection with the retention post of the end insulator. In an embodiment, no portion of retention post of the end insulator or the retention feature projects substantially over the rear surface of the circuit board.

In an embodiment, the circuit board includes an arcuate main body and at least one leg projecting radially inwardly from the main body to support at least one magnetic sensor in close proximity to the at least one permanent magnet. In an embodiment, the at least one leg is oriented along a radial plane that intersects the plurality of stator windings.

In an embodiment, the retention post includes a snap head and the circuit board includes a slot arranged to receive the snap head of the retention post. In an embodiment, the snap head does not substantially project out of the slot over the rear surface of the circuit board.

In an embodiment, the retention feature includes an overmold layer formed on the front surface of the circuit board facing the stator core. In an embodiment, the overmold layer forms a lip arranged at a distance from the front surface of the circuit board and configured to make a snap-fit connection with the snap head of the retention post.

In an embodiment, the retention feature includes a metal trap including two legs mounted on the front surface of the circuit board and a main body distanced from the front face of the circuit board partially overlapping the slot of the circuit board. In an embodiment, the main body is configured to make a snap-fit connection with the snap head of the retention post.

In an embodiment, the retention feature includes a place pad having a planar body mounted on the front face of the circuit board, the place pad including at least one snap projecting from the planar body overlapping the slot of the circuit board, the at least one snap being resiliently flexible to make a snap-fit connection with the retention post.

In an embodiment, the retention post includes a recess and the retention feature includes a clip disposed on the front surface of the circuit board. In an embodiment, the retention feature has an engagement edge extending from an edge of the circuit board that is received within the recess of the retention post.

In an embodiment, a power tool is provided including a tool housing and a BLDC motor as described in any of the embodiments above.

According to another aspect of this disclosure, a power tool is provided including a tool housing, a support plate provided within the tool housing, a rear tool cap separately formed from the tool housing and mounted on a rear end of the tool housing, and a brushless direct-current (BLDC) motor received within the housing. The BLDC motor includes a stator assembly including a stator core having an outer surface, stator teeth radially extending from the stator core and defining slots therebetween, and stator windings wound around the stator teeth. The BLDC motor further includes a rotor shaft extending along a longitudinal axis, a front motor bearing mounted on the rotor shaft and supported by the support plate, a rear motor bearing mounted on the rotor shaft and supported by the rear tool cap, and a rotor including a rotor core mounted on the rotor shaft to rotate relative to the stator assembly. The rear end cap includes a radial body, a bearing pocket formed on or within the radial body to support the rear motor bearing, a peripheral portion that mates with the rear end of the tool housing, and a constraining member configured to engage a portion of the stator assembly to pilot the stator assembly and the rear motor bearing relative to the rear end cap independently of the tool housing.

In an embodiment, the constraining member includes at least one constraining wall extending axially along a first circumference radially outward of the outer surface of the stator core. In an embodiment, the first circumference is radially inward of the peripheral portion of the rear end cap.

In an embodiment, the constraining wall includes tuning pads having inner surfaces oriented along a second circumference that substantially corresponds to the outer surface of the stator core to form-fittingly receive the outer surface of the stator assembly within the rear end cap.

In an embodiment, the constraining wall includes two or more spaced apart arcuate constraining walls forming circumferential gaps therebetween.

In an embodiment, a motor fan is mounted on the rotor shaft within the rear end cap between the stator assembly and the radial body of the rear end cap. The fan includes a main body oriented radially in line with the peripheral portion of the rear end cap and fan blades projecting towards the stator assembly.

In an embodiment, at least one exhaust vent is formed in the peripheral portion of the rear end cap radially aligned with the fan blades.

In an embodiment, the motor fan has a diameter that is smaller than a diameter of the outer surface of the stator core.

In an embodiment, the motor is an inner-rotor motor.

In an embodiment, the retention feature includes axial posts arranged to penetrate at least some of the stator slots in sliding contact with a portion of the stator assembly.

In an embodiment, each axial post engages an inner surface of the stator core forming the corresponding stator slot.

In an embodiment, each axial post engages tooth tips of adjacent ones of the stator teeth.

In an embodiment, the axial posts traverse substantially an entire length of the stator core.

In an embodiment, a motor fan is mounted on the rotor shaft between the stator assembly and a transmission mechanism of the power tool.

In an embodiment, the rotor core defines an annular recess within which at portion of the rear bearing and the bearing pocket of the rear end cap are located such that the a radial plane intersects the rear bearing, the axial posts, and the rotor core.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. It is to be understood that both the foregoing general description and the following detailed description are exemplary and explanatory only and are intended to provide an explanation of various embodiments of the present teachings.

Figure 1:
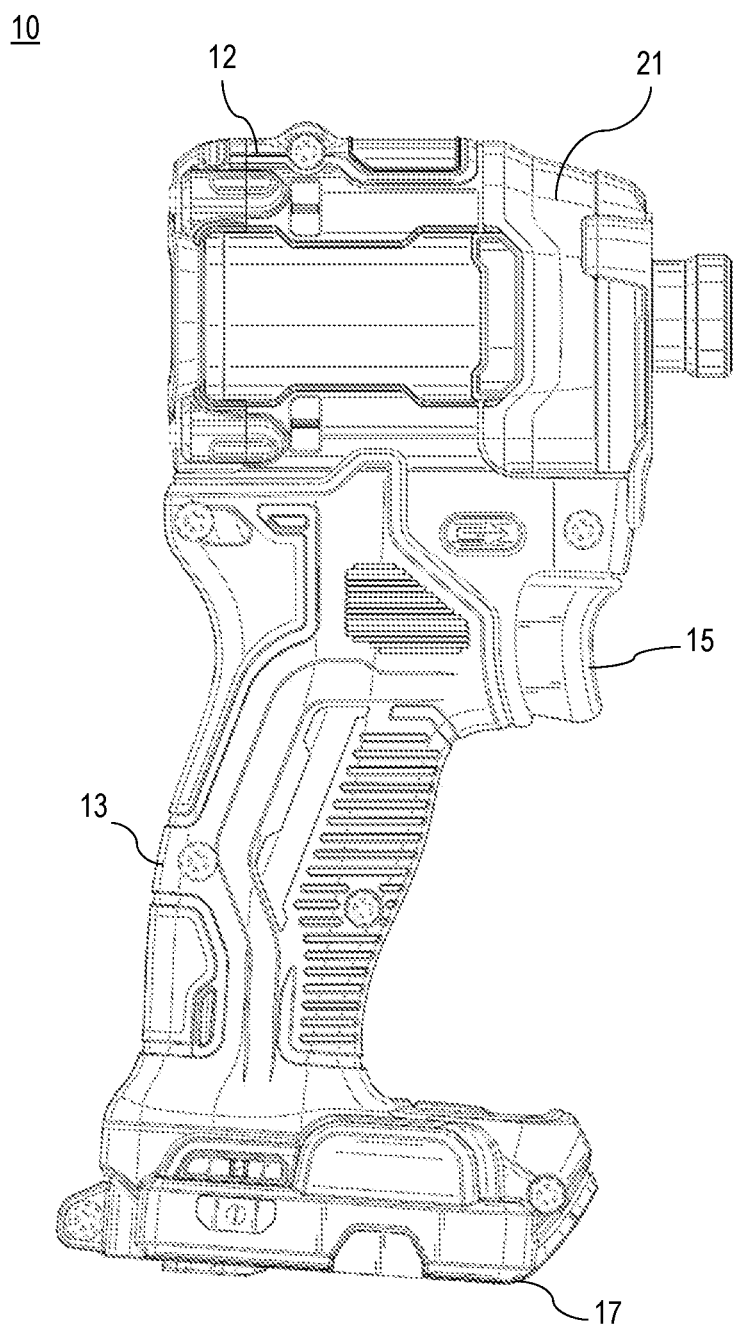
FIG. 1 depicts a side view of a first embodiment of a power tool, in this example an impact tool, according to an embodiment.
Figure 2A:
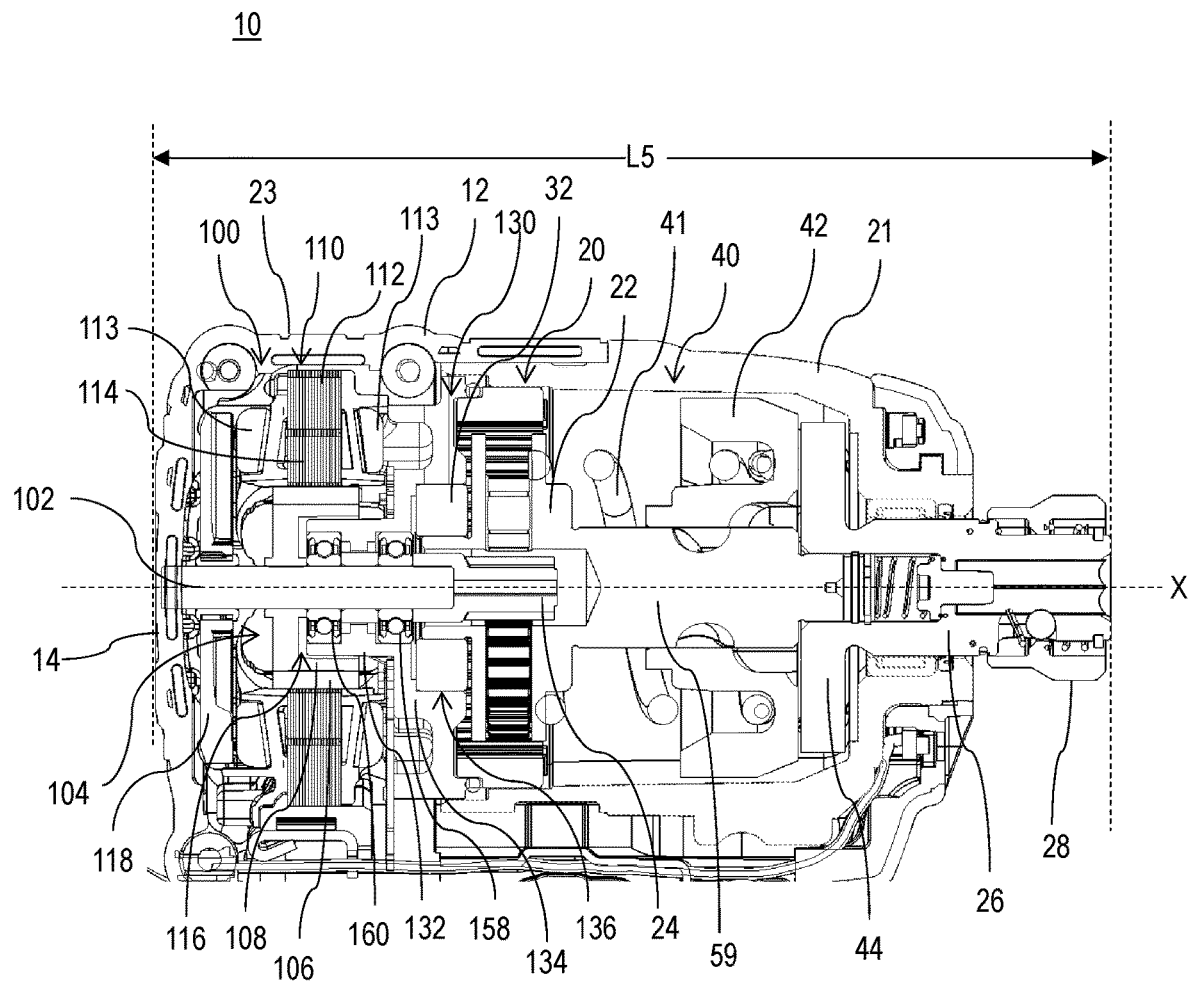
FIG. 2A depicts a partial cross-sectional view of an exemplary impact tool according to an embodiment.
Figure 2B:
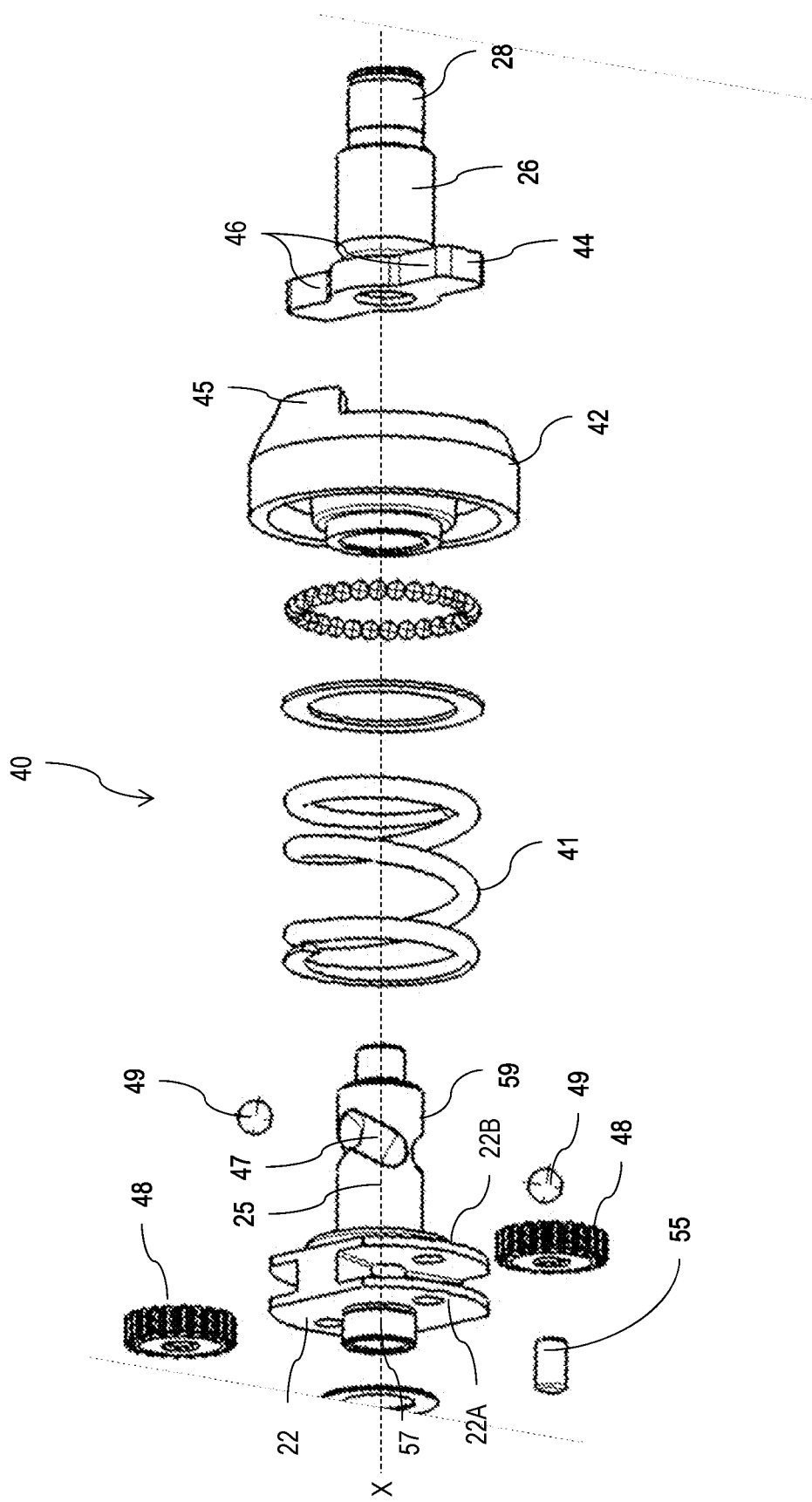
FIG. 2B depicts an exploded view of an impact mechanism of an exemplary impact tool according to an embodiment.
Figure 3:
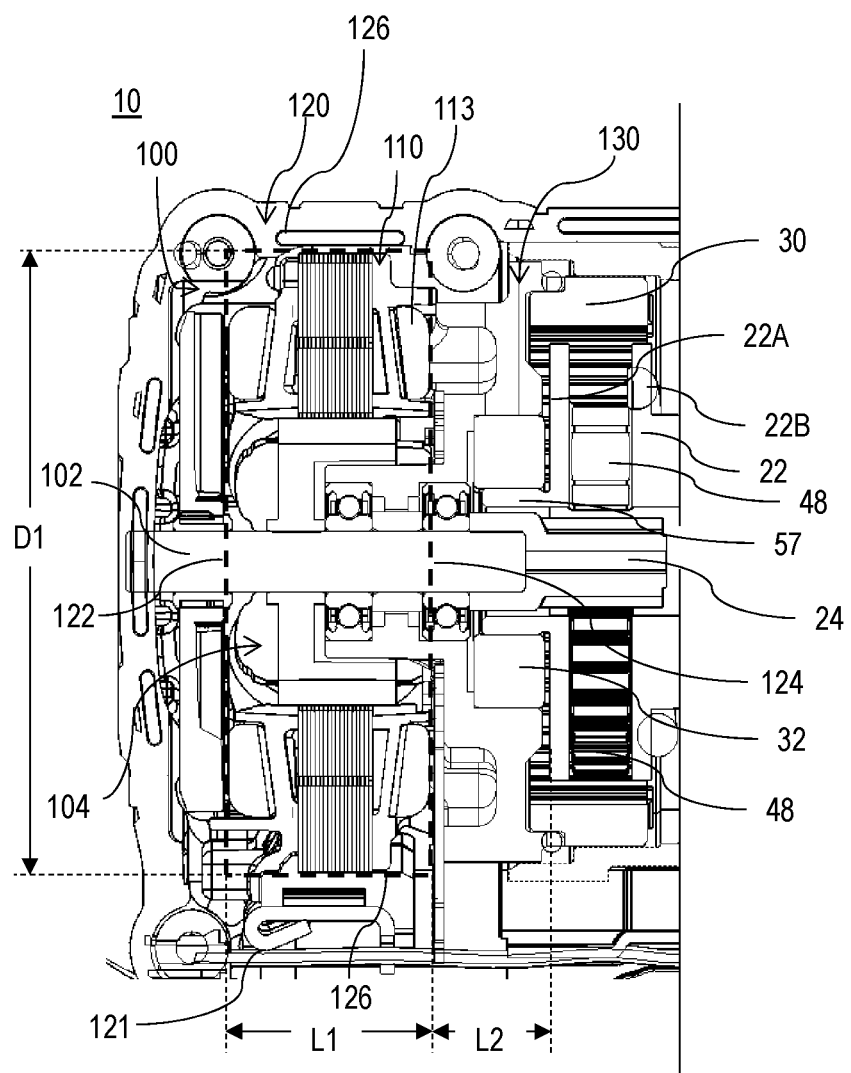
FIG. 3 depicts a zoomed-in partial cross-sectional view of an exemplary power tool, according to an embodiment.

FIG. 1 depicts a side view of a power tool 10, in this example an impact tool, according to an embodiment. FIG. 2A depicts a partial cross-sectional view of the exemplary impact tool 10 according to an embodiment. FIG. 2B depicts an exploded view of the exemplary impact tool 10 according to an embodiment. FIG. 3 depicts a zoomed-in partial cross-sectional view of the exemplary power tool 10, according to an embodiment.

In an embodiment, the exemplary impact tool 10 includes a housing 12 having a motor housing portion 23 including two clamshells that come together to house a motor 100 rotatably driving a rotor shaft 102 and a transmission housing portion 21 coupled to the motor housing portion 23 that houses a transmission assembly 20 and an impact mechanism 40 that together selectively impart rotary motion and/or a rotary impact motion to an output spindle 26. Coupled to the output spindle 26 is a tool holder 28 for retaining a tool bit (e.g., a drill bit, a screw driving bit, or a socket wrench, not shown). Further details regarding exemplary tool holders are set forth in U.S. patent application Ser. No. 12/394,426, which is incorporated herein by reference. The power tool further includes a handle 13 that extends transverse to the housing 12 and accommodates a trigger switch 15, a control and/or power module (not shown) that includes control electronics and switching components for driving the motor 100, and a battery receptacle 17 that receives a removeable power tool battery pack for supplying electric power to the motor 100. The handle 13 has a proximal portion coupled to the housing 12 and a distal portion coupled to the battery receptacle 17. The motor 100 may be powered by an electrical power source, such as a DC power source or battery (not shown), that is coupled to the battery receptacle 17, or by an AC power source. The trigger 15 is coupled to the handle 13 adjacent the housing 12. The trigger 15 connects the electrical power source to the motor 100 via the control and/or power module, which controls power delivery to the motor 100.

In an embodiment, the transmission assembly 20 may comprise a planetary transmission and may include, among other features, a pinion or sun gear 24 that is coupled to an end of the rotor shaft 102 of the motor 100 and that extends along a tool axis X. One or more planet gears 48 surround and have teeth that mesh with the teeth on the sun gear 24. An outer ring gear 30 is rotationally fixed to the housing 12 and centered on the tool axis X with internal teeth meshing with the teeth on the planet gears 48. A cam carrier 22 includes a pair of carrier plates 22A, 22B that support the planet gears 48 with pins 55 so that the planet gears 48 can rotate about the pins 55. The cam carrier 52 further includes a rearward protrusion 57 that extends axially rearward from the rear carrier plate 22A along the axis X and a cam shaft 59 that extends axially forward from the front carrier plate 22B along the axis X.

When the motor 100 is energized, the rotor shaft 102 and the sun gear 24 rotate about the axis X. Rotation of the sun gear 24 causes the planet gears 48 to orbit the sun gear 24 about the axis X, which in turn causes the cam carrier 22 to rotate about the axis X at a reduced speed relative to the rotational speed of the rotor shaft 102. In the illustrated embodiment, only a single planetary stage is shown. It should be understood that the transmission may include multiple planetary stages that may provide for multiple speed reductions, and that each stage can be selectively actuated to provide for multiple different output speeds of the planet carrier. Further, the transmission may include a different type of gear system such as a parallel axis transmission or a spur gear transmission.

The impact mechanism 40 includes the cam shaft 59, a generally cylindrical hammer 42 received over the cam shaft 59, and an anvil 44 fixedly coupled to the output spindle 26. The hammer 42 has two lugs 45 configured to engage two radial projections 46 on the anvil 44 in a rotating direction. Formed on an outer surface of the cam shaft 59 is a pair of rear-facing V-shaped cam grooves 47 with their open ends facing toward transmission assembly 20. A corresponding pair of forward-facing V-shaped cam grooves (not shown) is formed on an interior surface of the hammer 42 with their open ends facing toward the output spindle 26. Balls 49 are received in and rides along each of the cam grooves 47 to movably couple the hammer 42 to the cam shaft 59. A compression spring 41 is received in a cylindrical recess in the hammer 42 and abuts a forward face of the front carrier plate 22B. The spring 41 biases the hammer 42 toward the anvil 44 so that the so hammer lugs 45 engage the corresponding anvil projections 44.

At low torque levels, the impact mechanism 40 transmits torque from the transmission assembly 20 to the output spindle 26 in a rotary mode. In the rotary mode, the compression spring 41 maintains the hammer 42 in a forward position so that the hammer lugs 45 continuously engage the anvil projections 46. This causes the cam shaft 59, the hammer 42, the anvil 44, and the output spindle 26 to rotate together as a unit about the axis X. As torque increases, the impact mechanism 40 may transition to transmitting torque to the output spindle 26 in an impact mode. In the impact mode, the hammer 44 moves axially rearwardly against the force of the spring 41, decoupling the hammer lugs 45 from the anvil projections 46. The anvil 44 continues to spin freely on about the axis X without being driven by the motor assembly 100 and the transmission assembly 20, so that the anvil 44 coasts to a slower speed. Meanwhile, the hammer 42 continues to be driven at a higher speed by the motor assembly 100 and transmission assembly 20, while the hammer 42 moves axially rearwardly relative to the anvil 44 by the movement of the balls 49 in the V-shaped cam grooves 47. When the balls 49 reach their rearmost position in the V-shaped cam grooves 47, the spring 41 drives the hammer 42 axially forward with a rotational speed that exceeds the rotational speed of the anvil 44. This causes the hammer lugs 45 to rotationally strike the anvil projections 46, imparting a rotational impact to the output spindle 26.

In an embodiment, the motor 100 is a brushless direct-current (BLDC) motor that includes an inner rotor 104 having surface-mount magnets 106 on a rotor core 108 and a stator assembly 110 located around the rotor 104. The stator assembly 110 includes a stator core 112 having a series of teeth 114 projecting radially inwardly from the stator core 112, and a series of conductive windings 113 wound around the stator teeth 114 to define three phases connected in a wye or a delta configuration. As the phases of the stator assembly 110 are sequentially energized, they interact with the rotor magnets 106 to cause rotation of the rotor 104 relative to the stator assembly 110.

In an embodiment, the rotor core 108 is mounted on the rotor shaft 102 and includes an annular recess 116 around the rotor shaft 102 on one side of the rotor core 104. Specifically, the rotor 104 is provided with what is referred to in this disclosure as an open-core construction, where the rotor magnet 106 is mounted around the rotor core 112 and the annular recess 116 is provided within the rotor core 112 for positioning of one or more of the rotor bearings. The rotor core 112 may be made of a solid core piece of metal or lamination stack that includes a series of parallel laminations. The annular recess 116 may be carved or stamped out of the rotor core 112, or it may be formed using ring-shaped laminations.

In an embodiment, the rotor magnet 106 is a ring surface-mounted on the outer surface of the rotor core 108 and magnetized in a series of poles, e.g., four poles having a S-N-S-N orientation. Alternatively, rotor magnet 106 may be provided as a series of discrete magnet segments that may be pre-magnetized prior to assembly. The outer surface of the rotor core 108 may be shaped for proper retention of the magnet segments. In yet another embodiment, the rotor magnets 106 may be fully or partially embedded within the rotor core 108.

In an embodiment, a fan 118 is mounted on the rotor shaft 102 behind the motor assembly 100. In an embodiment, a rear tool cap 14 is mounted to the end of the housing 12 to contain the end of the motor 100. The rear tool cap 14 may be provided integrally with the housing 12 or as a separate piece. In an embodiment, the fan 118 is positioned between the motor 100 and the rear tool cap 14. The fan 118 generates airflow through the motor 100 and (preferably) the transmission assembly 20 to cool the components.

In an embodiment, a support plate 130 supports front and rear motor bearings 158 and 160 that support the rotor shaft 102. At least the rear motor bearing 160 is located within the stator assembly 110 and within the annular recess 116 of the rotor core 108 along the axial direction of the motor 100 such that the rear motor bearing 160 intersects a portion of the rotor core 108 along a radial plane. The support plate 130 includes a cylindrical portion 132 that receives the outer races of the motor bearings 158 and 160 and a radial portion 134 that extends radially from the cylindrical portion 132 and includes radial ends supported by the tool housing 12. The stator assembly 110 is also supported by the tool housing 12, thus being axially and radially secure with respect to the support plate 130. In this manner, the support plate 130 axially and radially supports the rotor 104 within the stator assembly 110. In an embodiment, the support plate 130 and the stator assembly 110 may be independently supported by the tool housing 12. In another embodiment, the support plate may be formed integrally as a part of two clamshells that form the tool housing 12. Alternatively, the support plate 130 may be piloted to and retained by the stator assembly 110 directly and independently of the tool housing 12.

In an embodiment, as shown in FIGS. 2A and 3, the support plate 130 also has a front lip 131 that supports a component of the transmission assembly 20, such as supporting the ring gear 30, to inhibit axially and rotational movement of the ring gear 30 relative to the housing 12. In addition, the support plate 130 supports a cam carrier bearing 32 that supports the cam carrier 22 relative to the support plate 130, and therefore relative to the motor 100 and the tool housing 12. The cam carrier bearing 32 is nested within the support plate 130 adjacent the motor 100. Specifically, the support plate 130 is positioned between the motor assembly 100 and transmission assembly 20 and provides support for the motor bearings 158 and 160 on one side and for the cam carrier bearing 32 on the other side. In an embodiment, the support plate 130 includes a recessed portion 136 that includes a larger diameter than the cylindrical portion 134 and is sized to receive the cam carrier bearing 32 therein. The cam carrier bearing 32 is thus located axially forward of the entire motor assembly 100.

At least a portion of the support plate 130 is received within the stator assembly 110 and within the rotor core 108. In this embodiment, the rear cylindrical projection of the support plate that supports the motor bearings 158 and 160 is at least partially received within the stator assembly 110 and within the motor core 108. In this embodiment, the nested arrangement of the one or more motor bearings 158 and 160 and the support plate 130 provide a compact motor assembly 100 compared to conventionally available brushless motors. Disposition of the one or more bearings 158 and 160 and at least a portion of the support plate 130 within the stator assembly 110 and within the rotor core 108 reduces the length of the motor assembly 100 and the overall power tool and improves power density.

In an embodiment, motor assembly 100 defines a motor envelope 120 bounded by a rear plane 122 at a rearmost point of the motor assembly 100 (i.e., at the rearmost point of the stator assembly 110), a front plane 124 at a frontmost point of the motor assembly 100 (i.e., at the frontmost point of the stator assembly 110), and a generally cylindrical boundary 126 extending from the rear plane 122 to the front plane 124 and surrounding a radially outermost portion of the motor assembly 100 (e.g., a radially outermost portion of the stator assembly 110) not including terminal block 121. In the illustrated embodiment, the rear plane 122 is at a rearmost point of the stator assembly 110 (including its windings 113), the front plane 124 is at a frontmost point of the stator assembly 110 (including its windings 113), and the generally cylindrical boundary 126 surrounds a radially outermost portion of the stator assembly 110. However, it should be understood that the rear plane may be at a rearmost point of the rotor 104 (if that extends further rearward than the stator assembly 110), the front plane may be at a frontmost point of the rotor 104 (if that extends further frontward than the stator assembly 110), and the generally cylindrical boundary may be at an outermost point of the rotor 104 (if that extends further radially outward than the stator assembly 110, e.g., in an outer rotor motor). The motor envelope 120 may have a length L1 from the rear plane 122 to the front plane 124 of approximately 16 mm to 20 mm (e.g., approximately 18.4 mm) and a diameter D1 of the cylindrical boundary 126 of approximately 40 mm to 60 mm (e.g., approximately 51 mm), with a volume of approximately 20 cm$^2$ to 56 cm$^2$ (e.g., approximately 38 cm$^2$). In an embodiment, at least a portion of at least one of the motor bearings 158 and 160 and at least a portion of the support plate 130 are received within the motor envelope 120.

Figure 4:
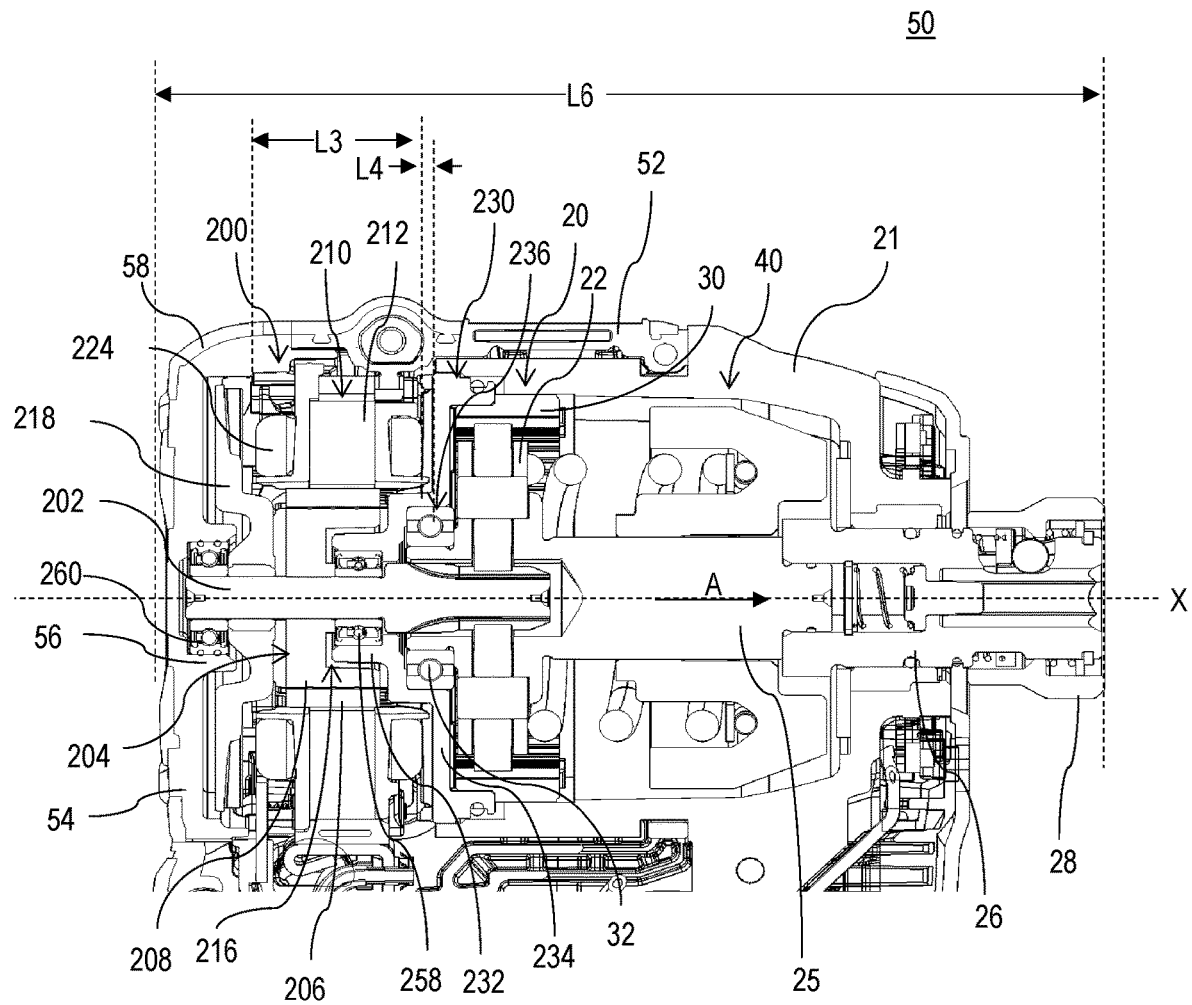
FIG. 4 depicts a side cross-sectional view of a second embodiment of a power tool including a motor assembly and support plate sized and optimized to reduce the length of the power tool, according to an embodiment.

An alternative embodiment of a power tool 50 is described herein with reference to FIGS. 4-10. FIG. 4 depicts a side cross-sectional view of the power tool 50 including a motor assembly 200 and support plate 230 sized and optimized to reduce the length of the power tool 50, according to an embodiment. In an embodiment, power tool 50 includes many of the same features as power tool 10 described above, such as transmission assembly 20, impact mechanism 40, output spindle 26, tool holder 28, handle 13, trigger 15, battery receptacle 17, etc., details of which are not repeated here, except as necessary to describe this alternative embodiment. In an embodiment, a rear end cap 50 is mounted on a rear end of the housing 52 rearward of the motor assembly 200. In this embodiment, the support plate 130 is designed to locate the cam carrier bearing 32 along the same radial plane as at least an end of the stator windings, so the cam carrier bearing 32 is located at least partially within an envelope formed by the ends of the motor assembly 200.

In an embodiment, motor assembly 200 includes many of the same features described above with reference to FIG. 1. In an embodiment, motor assembly 200 includes a rotor shaft 202, an inner rotor 204 mounted on the rotor shaft 202 having a surface-mount magnet ring 206 on a rotor core 208, and a stator assembly 210 located around the rotor 204. The stator assembly 210 includes a stator core 212, a series of stator teeth 214 radially projecting inwardly from the stator core 212, and a series of conductive windings 113 wound around the stator teeth 214 to define three phases connected in a wye or a delta configuration.

In an embodiment, the motor assembly 200 defines a tool axis X extending through the center of the rotor shaft 202 extending from a rear of the power tool 50 (i.e., where the rear end cap 50 is located) to a front of the power tool (i.e., where tool holder 28 is located). In this disclosure, the terms "rear" and "front" are used to describe positions of various components along the tool axis X in the direction A shown in FIG. 4. Thus, as an example, the motor assembly 200 is disposed rearwardly of the transmission assembly 20.

In an embodiment, the rotor core 208 is mounted on the rotor shaft 202 and includes an annular recess 216 around the rotor shaft 202 on one side of the rotor core 208 for positioning of one or more of the rotor bearings 258 and 260. The rotor core 212 may be made of a solid core piece of metal or lamination stack that includes a series of parallel laminations. The annular recess 216 may be carved or stamped out of the rotor core 212, or it may be formed using ring-shaped laminations. The rotor magnet 106 may be ring-sized or segmented, and it may be surface-mounted or embedded within the rotor core 208.

Figure 5:
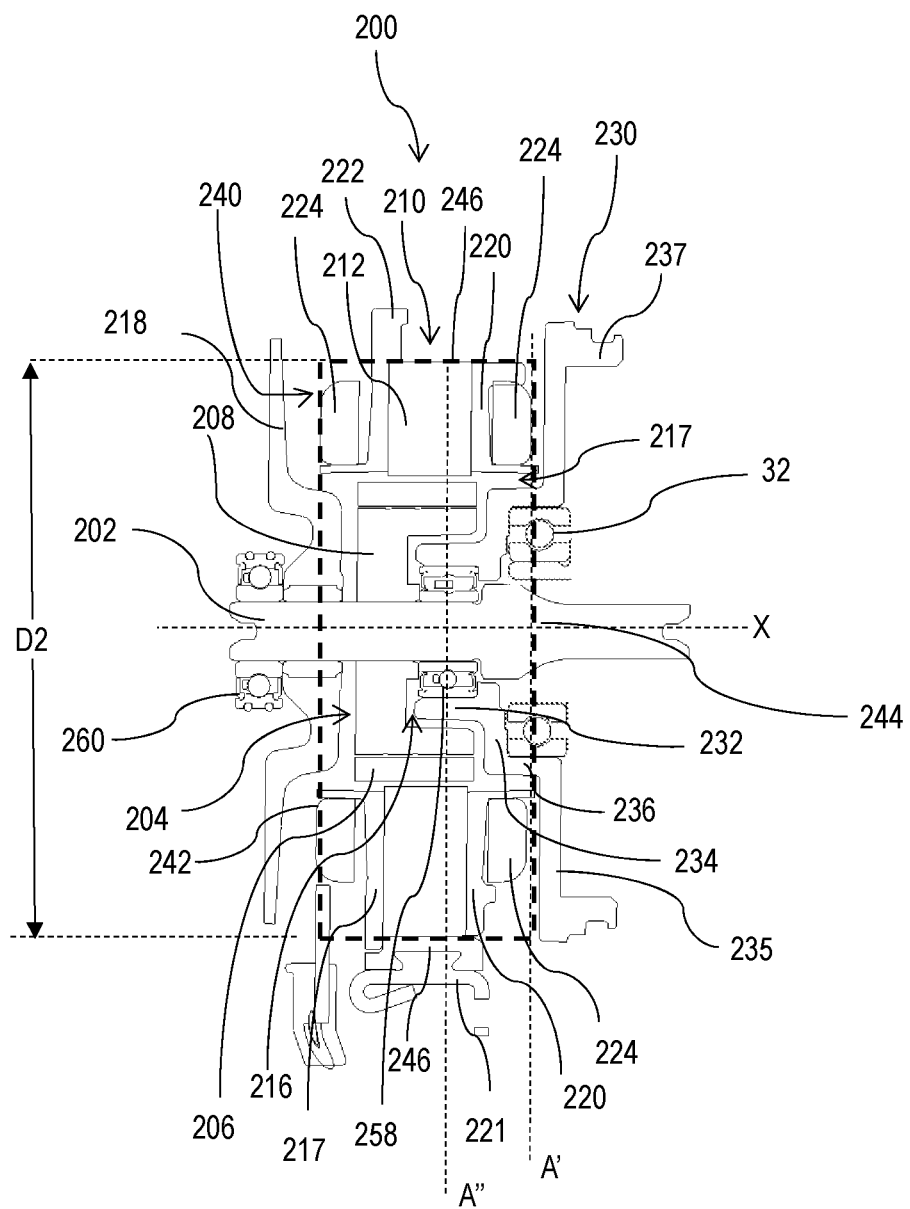
FIG. 5 depicts a zoomed-in side cross-sectional view of the support plate and the motor assembly, according to an embodiment.
Figure 6:
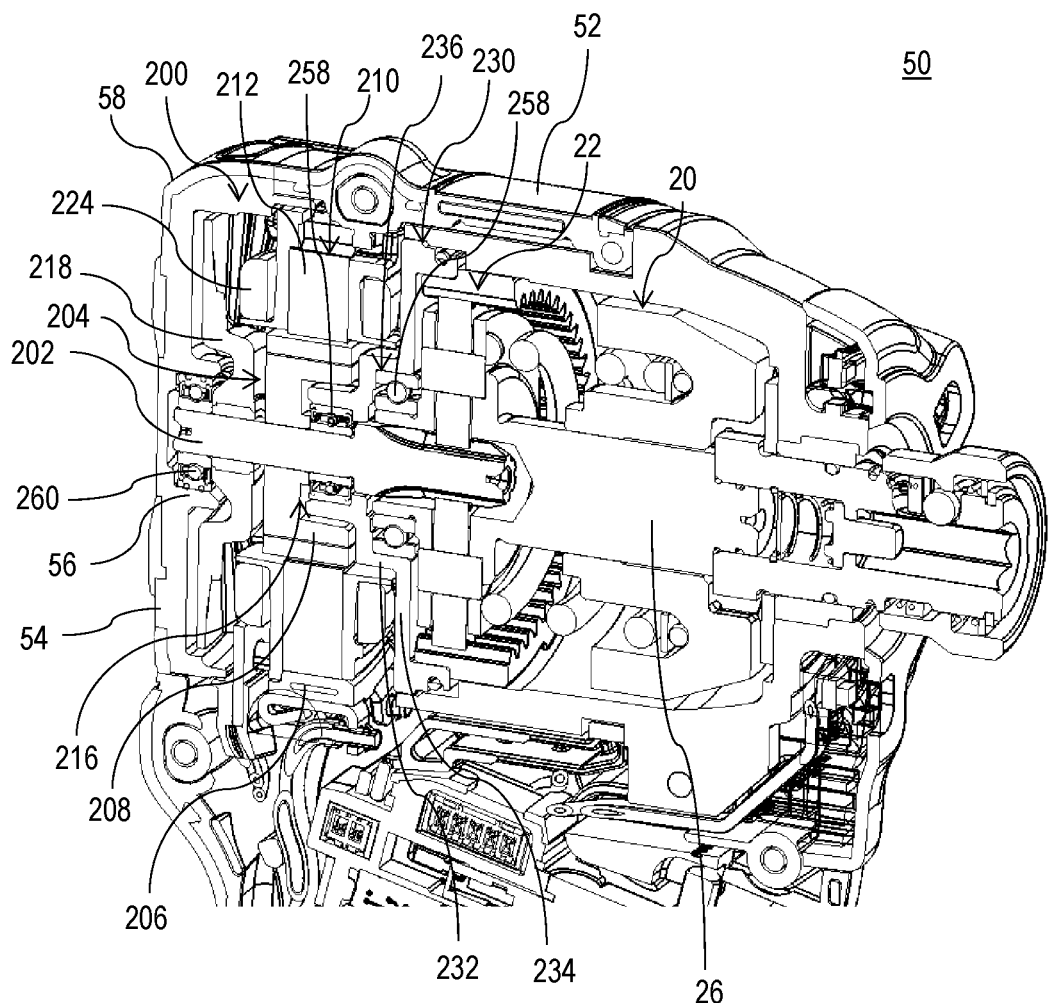
FIG. 6 depicts a perspective cross-sectional view of the motor assembly, according to an embodiment.
Figure 7A:
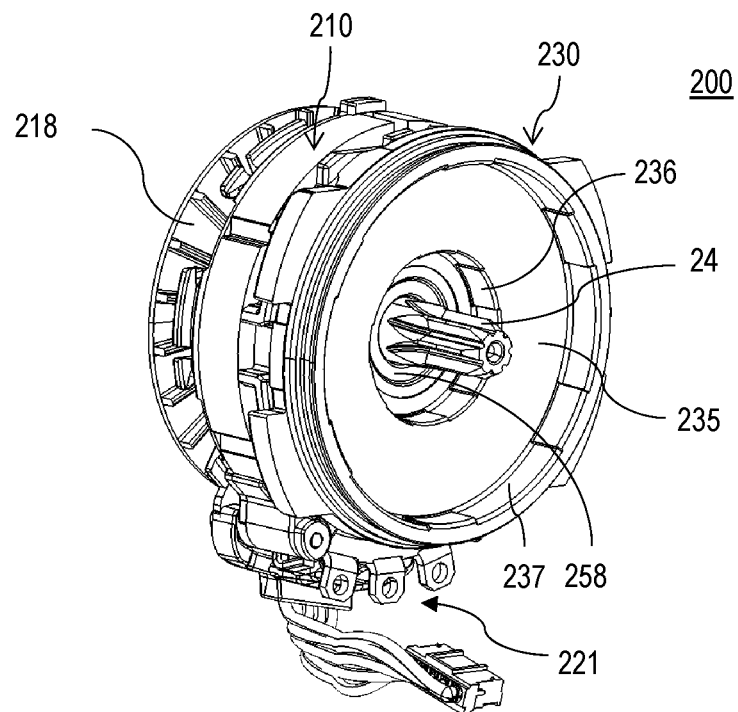
FIGS. 7A and 7B depicts perspective and side views of the motor assembly respectively, according to an embodiment.
Figure 7B:
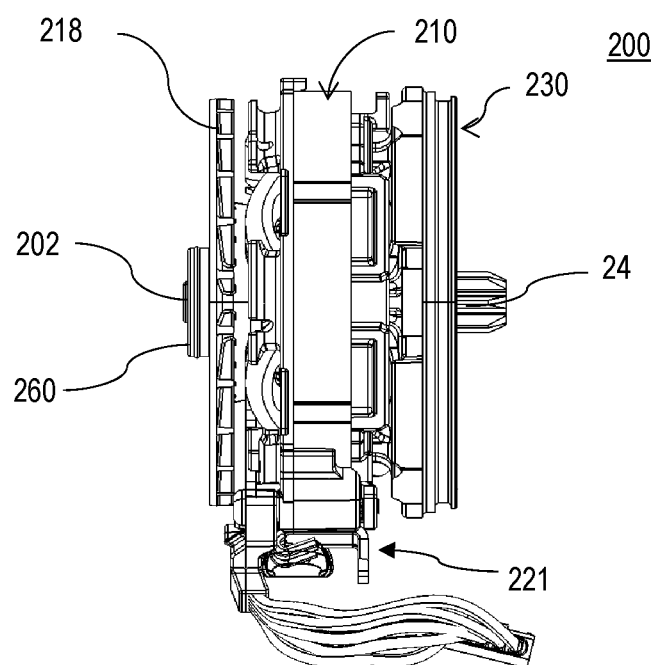
Figure 8A:
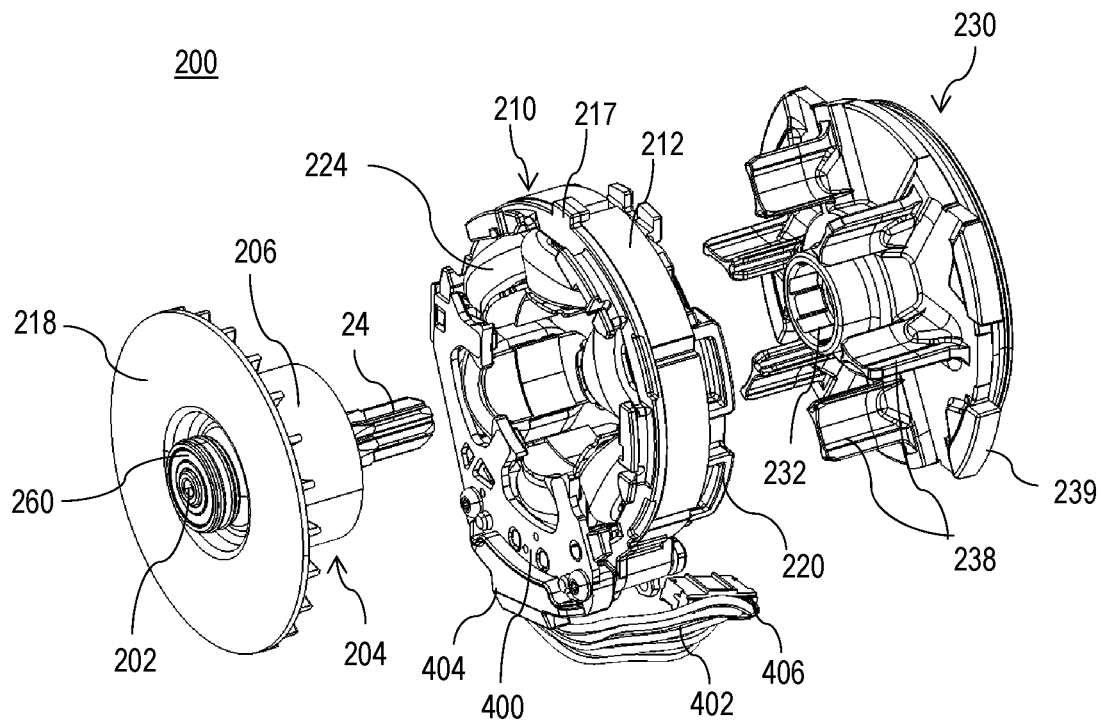
FIGS. 8A and 8B depict two perspective exploded views of the same motor assembly, according to an embodiment.
Figure 8B:
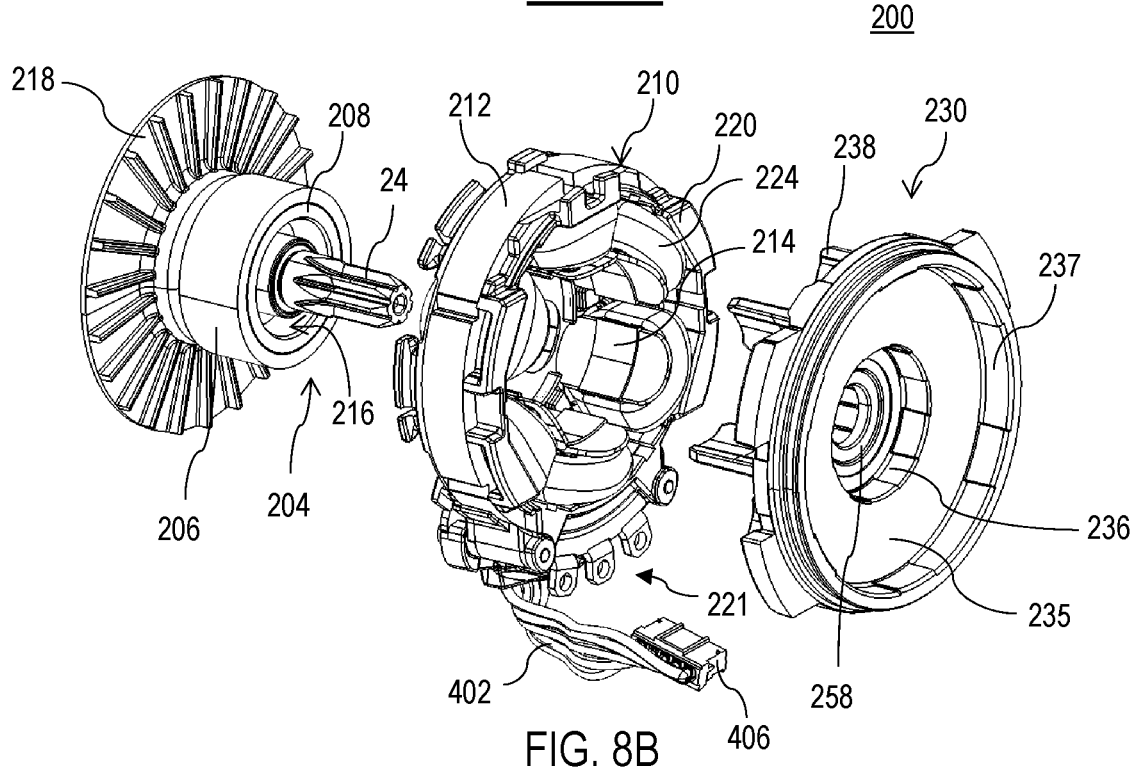

FIG. 5 depicts a zoomed-in side cross-sectional view of the support plate 230 and the motor assembly 200, according to an embodiment. FIG. 6 depicts a perspective cross-sectional view of the motor assembly 200, according to an embodiment. FIGS. 7A and 7B depicts perspective and side views of the motor assembly 200 respectively, according to an embodiment. FIGS. 8A and 8B depict two perspective exploded views of the same motor assembly 200, according to an embodiment. Various aspects of the motor assembly 200 and the support plate 230 are described with reference to these figures.

In an embodiment, the support plate 230 includes a first bearing pocket 232 formed as a cylindrical or rim-shaped projection from a radial portion 234 for supporting at least the front motor bearing 258. The first bearing pocket 232 of the support plate 230 at least partially projects into and is received within the annular recess 216 of the rotor 204. This allows the front bear motor bearing 258 to be received at least partially within the stator assembly 210 and within an envelope of the rotor core 208 defined by the radial surfaces of the rotor core 208.

In an embodiment, the support plate 230 further includes a second bearing pocket 236 for supporting the cam carrier bearing 32. The second bearing pocket 236 may be formed as a recessed portion of the radial portion 234 of the support plate 230 facing away from the first bearing pocket 232. In an embodiment, second bearing pocket 236 is formed as an intermediate annular portion formed between the radial portion 234 and a radial wall 235, where the radial portion 234 is located along a radial plane that intersects a portion of the stator assembly 210, and the radial wall 235 is located adjacent a front end of the stator assembly 210. As such, the radial portion 234 extends between a front end of the first bearing pocket 232 and a rear end of the second bearing pocket 236. In an embodiment, the radial wall 235 extends from the front end of the second bearing pocket 236 radially outwardly and is supported by either the tool housing 52 or the stator assembly 210. In an embodiment, support plate 230 further includes an outer rim portion or lip 237 projecting axially forward from an outer circumference of the radial wall 235 for coupling with an outer portion of the transmission housing 21 and/or the tool housing 52 and for receiving and supporting a component of the transmission assembly 20, such as the ring gear 30 of the transmission assembly 20.

In an embodiment, the second bearing pocket 236 has a larger inner diameter than the first bearing pocket 232. In an embodiment, second bearing pocket 236 has approximately the same inner diameter as the outside surface of the rotor core 208. In an embodiment, the outer surface of the second bearing pocket 236 is received within the opening of the stator 210, i.e., within the inner diameter formed by front ends of the stator windings 224 adjacent the rotor 204. In an embodiment, the outer annular surface of the second bearing pocket 236 may be in physical contact with the stator windings 224 or a front end insulator 220 of the stator assembly 210, though in the illustrated figured, a small air gap 217 radially separates the outer annular surface of the second bearing pocket 236 from the stator windings 224 and the front end insulator 220 of the stator assembly 210.

In an embodiment, the cam carrier bearing 32 is received within the second bearing pocket 236 so that it is at least partially nested within the stator assembly 210 along a radial plane A' that intersects the front ends of the stator windings 224.

In an embodiment, the motor assembly 200 defines a motor envelope 240 similar to the motor envelope 120 of the motor 100, described above. The motor envelope 240 is bounded by a rear plane 242 at a rearmost point of the motor assembly 200 (i.e., at the rearmost point of the stator assembly 210), a front plane 244 at a frontmost point of the motor assembly 200, and a generally cylindrical boundary 246 extending from the rear plane 242 to the front plane 244 and surrounding a radially outermost portion of the motor assembly 200 (e.g., a radially outermost portion of the stator assembly 210). In the illustrated embodiment, the rear plane 242 is at a rearmost point of the stator assembly 210 (including its stator windings 224), the front plane 244 is at a frontmost point of the stator assembly 210 (including its stator windings 224), and the generally cylindrical boundary 246 surrounds a radially outermost portion of the stator assembly 210 (not including the terminal block 221). However, it should be understood that the rear plane may be at a rearmost point of the rotor 204 (if that extends further rearward than the stator assembly 210), the front plane may be at a frontmost point of the rotor 204 (if that extends further frontward than the stator assembly 210), and the generally cylindrical boundary may be at an outermost point of the rotor 204 (if that extends further radially outward than the stator assembly 210, e.g., in an outer rotor motor). As shown in FIGS. 4 and 5, the motor envelope 240 may have a length L3 from the rear plane 242 to the front plane 244 of approximately 16 mm to 20 mm (e.g., approximately 18.4 mm) and a diameter D1 of the cylindrical boundary 246 of approximately 40 mm to 60 mm (e.g., approximately 51 mm), with a volume of approximately 20 cm$^2$ to 56 cm$^2$ (e.g., approximately 38 cm$^2$). In an embodiment, at least a portion of the front motor bearing 258 and at least a portion of the support plate 230 are received within the motor envelope 120.

In an embodiment, as best seen in FIGS. 8A and 8B, support plate 230 is provided with radially outwardly extending axial posts or fins 238 provided for piloting and supporting the support plate 230 relative to the stator assembly 210. In an embodiment, axial posts 238 are received within respective slots of the stator assembly 210 formed circumferentially between stator windings 224. In an embodiment, axial posts 238 come into contact with the inner surface of the stator core 212 or adjacent inner tips of the stator teeth 214. In this manner, the support plate 230 is radially supported with respect to the stator assembly 210 independently of the power tool housing 52. In an embodiment, support plate 230 further includes one or more circumferential projections 239 that engage a portion of the tool housing 52 to provide axial support for the support plate 230 relative to the stator assembly 210. In an embodiment, a series of six axial posts 238 are provided, each project from a rear surface of the radial wall 235 around the first bearing pocket 232. In an embodiment, length of the axial posts 238 is approximately equal to or greater than the length of the first bearing pocket 232 in the direction of the stator assembly 210 to allow the axial posts 238 to extend into the slots of the stator assembly 210. Reference is made to US Patent Publication No. 2017/0294819A1, which is incorporated herein by reference in its entirety, for a description of the axial posts for piloting and support of a bearing support structure relative to the inner diameter of the stator.

In an alternative embodiment not shown here, instead of axial posts 238, the support plate 230 may be piloted and supported via one or more circumferential constraining walls that extend over the outside surface of the stator core 212. Reference is made to U.S. Pat. No. 10,056,806, which is incorporated herein by reference in its entirety, for a description of the peripheral walls for piloting and support of a bearing support structure relative to the outer diameter of the stator.

In an embodiment, stator assembly 210 includes front and rear end insulators 220 and 222 disposed on axial ends of the stator core 212 to electrically insulate the stator windings 224 from the stator core 212. In an embodiment, one or more of the end insulators 220 and 222 support a terminal block 221 on the lower surface of the stator core 212. The terminal block 221 includes a series of motor terminals that connect via a series of wires to a power module (not shown) disposed in the tool housing 52 to receive electric power. The motor terminals are also electrically connected to the stator windings 224. In an embodiment, the terminal block 221 is provided along a radial plane A" that also intersects the front motor bearing 258 and the rotor magnet ring 206.

In an embodiment, both motor bearings 258 and 260 may be supported at least partially within the rotor annular recess 216 if the length of the stator core 212 and the corresponding length of the rotor core 208 is sufficiently large to accommodate both motor bearings 258 and 260. Alternatively, in an embodiment as shown in FIG. 2, where the length of the rotor core 208 is not sufficiently large to receive both bearings 258 and 260 within the annular recess 216, the front motor bearing 258 is supported within the annular recess 216 of the rotor core 212 while the rear motor bearing 260 is supported in rear tool cap 54 of the tool housing 52. In an embodiment, rear tool cap 54 includes a radial body that includes a central bearing pocket 56 for supporting the rear motor bearing 260. In an embodiment, rear tool cap 54 includes a peripheral portion 58 that is secured to the tool housing 52. Alternatively, the rear tool cap 54 may be formed integrally as a part of the clamshell that forms the tool housing 52.

In an embodiment, fan 218 is mounted on the rotor shaft 202 to rotate with the rotation of the motor 200. The fan 218 includes a radial main body and a plurality of blades facing the stator assembly 210. In an embodiment, an inner portion of the fan 218 is recessed to allow the rear motor bearing 260 to be nested at least partially in the axial directed within the fan 218 to be aligned radially with the main body of the fan 218. The central bearing pocket 56 of the rear tool cap 54 is axially received within the recess portion of the fan 218 around the rear motor bearing 260. In this manner, positioning of the rear motor bearing 260 within the rear tool cap 54 does not pose a significant increase in the overall length of the motor assembly 200.

Figure 9:
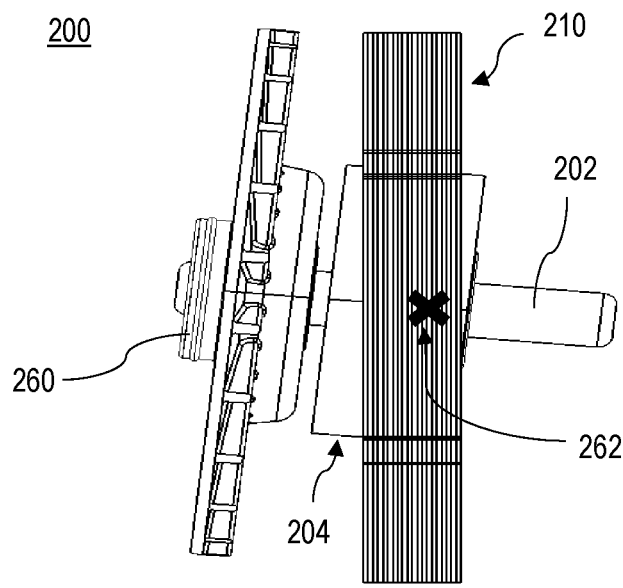
FIG. 9 depict a side view of the motor assembly of FIG. 2 to illustrate an advantage of the support plate and nested rotor bearing configuration, according to an embodiment.

FIG. 9 depict a side view of the motor assembly 200 of FIG. 2 to illustrate an advantage of the support plate configuration described above, where the front motor bearing 258 is nested within the envelope of the stator assembly 210 and at least partially within the rotor 204. In the event of egregious movement of the rotor shaft 202 due to a fall, high vibration, or high impact, the rotor shaft 202 may be pivoted away from the longitudinal axis relative to the stator assembly 210. This pivoting movement may take place around a pivot point 262 aligned with the front motor bearing 258. The pivot point 262 is associated with tolerances in the bearings of the front motor bearing 258, tolerances between the front motor bearing 258 and the rotor 204, and/or tolerances between the front motor bearing 258 and the stator assembly 210. Since the pivot point 262 is located within the envelope of the stator assembly 210, in the event of such a pivoting movement of the rotor shaft 202, the likelihood that the rotor shaft 202 makes physical contact with the stator assembly 210 is significantly reduced.

Figure 10:
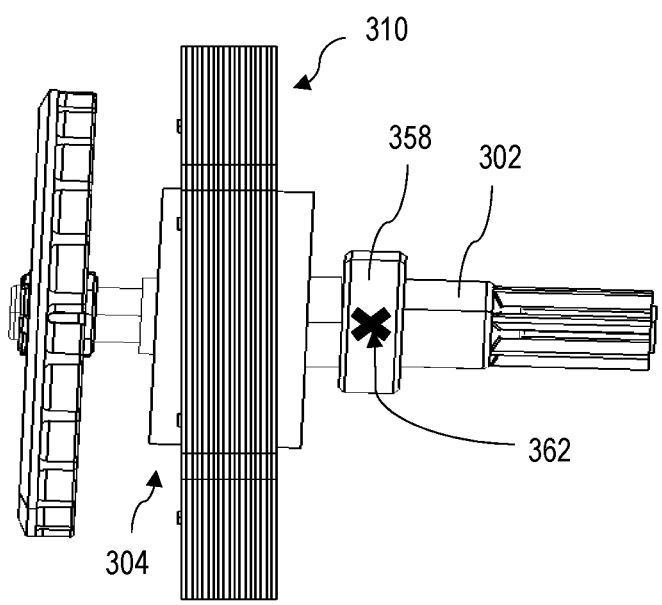
FIG. 10 depicts a side view of a prior art motor without a nested rotor bearing.

By comparison, FIG. 10 depicts a side view of a prior art motor 300, in which the front rotor bearing 358 is not nested within the rotor 304 and therefore provided outside the envelope of the stator assembly 310. In an embodiment, in the event of egregious rotor shaft movement, the pivot point 362 for pivoting movement of the rotor shaft 302 relative to the longitudinal axis is located away from the stator assembly 310. Thus, in the event of a pivoting movement of the rotor shaft 302, there is a likelihood that the rotor shaft 302 makes physical contact with a portion of the stator assembly 310.

Various embodiments of the rotor 204 including the outer magnet ring 206 are described here with reference to FIGS. 11-14.

Figure 11:
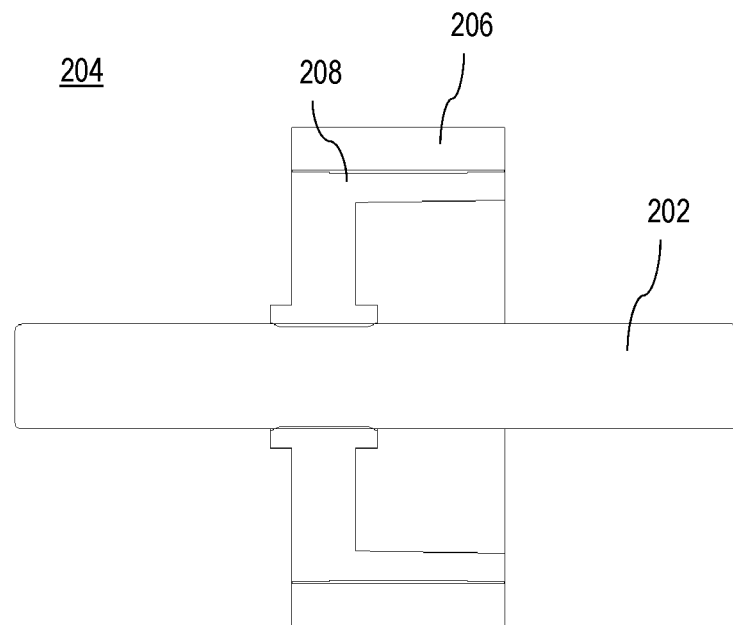
FIG. 11 depicts a side cross-sectional view of the rotor, according to an embodiment.
Figure 12:
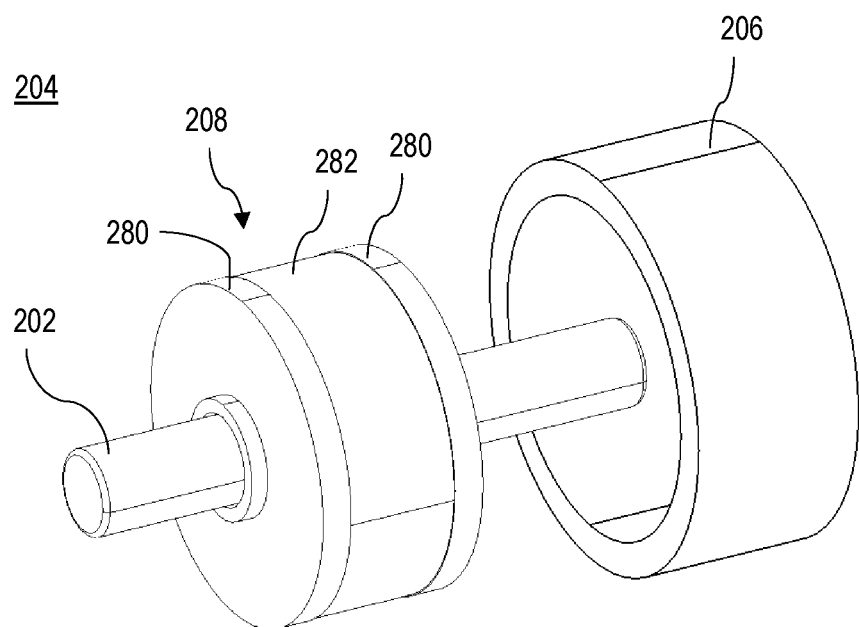
FIG. 12 depicts a perspective exploded view of the rotor, according to an embodiment.

FIG. 11 depicts a side cross-sectional view of the rotor 204, according to an embodiment. FIG. 12 depicts a perspective exploded view of the rotor 204, according to an embodiment. In an embodiment, as described briefly previously, the rotor 204 includes a permanent magnet ring 206 that is sized to be received over an outside surface of the rotor core 208. The magnet ring 206 may be made of sintered, hot-extrusion (MQ3), bonded, and/or injection-molded magnetic material. In another embodiment, the magnet ring 206 comprises a sintered magnet including magnet alloy that is pulverized, magnetically aligned within a magnetic field for magnetization, press molded, and then sintered. In an embodiment, magnet ring 206 may comprise a series of discrete permanent magnets mounted on the rotor core 208 as a unit. In an embodiment, the discrete magnets may be bonded together before or after magnetization. In an embodiment, the rotor core 208 may include a fully annular body.

In an embodiment, to properly secure the magnet ring 206, a thin layer of adhesive is provided between the magnet ring 206 and the rotor core 208. To accommodate the adhesive, in an embodiment, the inner diameter of the magnet ring 206 in this case is slightly greater than the outer diameter of the rotor core 208. This may cause the magnet ring 206 to be acentric relative to the rotor core 208.

Alternatively, in an embodiment, as shown in FIGS. 11 and 12, the rotor core 208 includes two annular alignment rings 280 at its two axial ends. Annular alignment rings 280 may be provided by carving out a middle area 282 of the rotor core 208 such that each of the annular alignment rings 280 have a slightly greater diameter than the middle area 282, e.g., by approximately 0.1 mm to 0.6 mm, preferably 0.1 mm to 0.3 mm. The adhesive (not shown) is applied on the middle area 282 of the outer surface of the rotor core 208 for retaining the magnet ring 206. Annular alignment rings 280 have approximately the same diameter as the inner diameter of the magnet ring 206 to ensure a tight fit and proper alignment between the magnet ring 206 and the rotor core 208.

Figure 13:
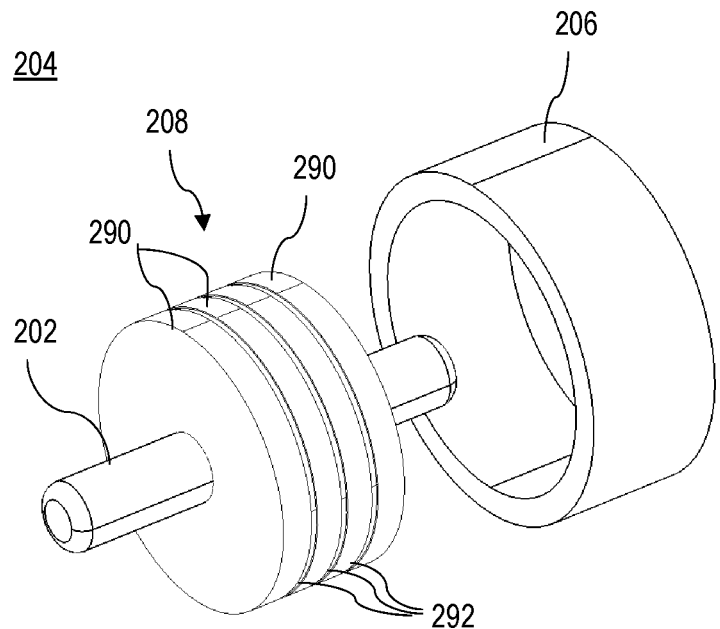
FIG. 13 depicts a perspective exploded view of the rotor, according to another embodiment.

FIG. 13 depicts a perspective exploded view of the rotor 204, according to another embodiment. In this embodiment, rotor core 208 includes a series of alignment rings 290, forming annular grooves 292 therebetween. Annular grooves 292 may be, for example, 0.05 to 0.3 mm deep relative to the outer surface of the rotor core 208. The adhesive (not shown) is applied within the grooves 292 for retaining the magnet ring 206. Annular alignment rings 290 have approximately the same diameter as the inner diameter of the magnet ring 206 to ensure a tight fit and proper alignment between the magnet ring 206 and the rotor core 208. Alternatively, in an embodiment, annular alignment rings 290 has a slightly smaller diameter than the inner diameter of the magnet ring 206 to allow the adhesive to spread over the outer surface of rotor core 208, though this arrangement may require an additional equipment for proper alignment of the rotor core 208 and the magnet ring 206.

Figure 14:
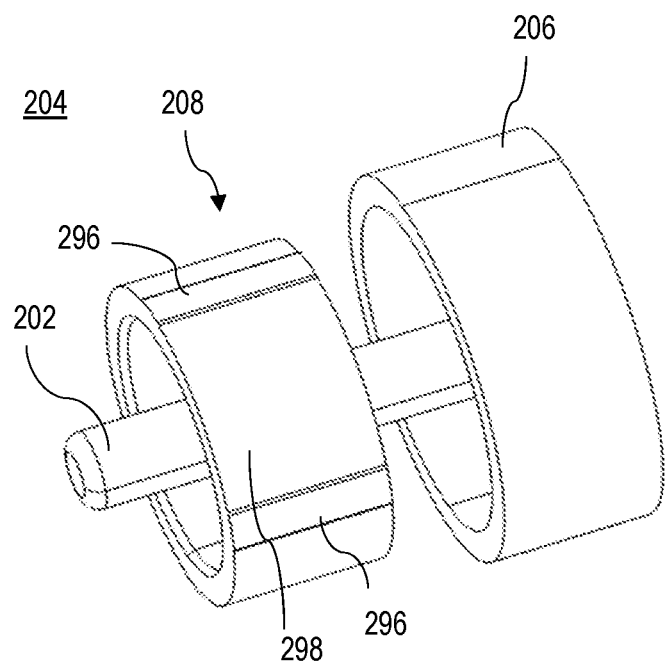
FIG. 14 depicts a perspective exploded view of the rotor, according to yet another embodiment.

FIG. 14 depicts a perspective exploded view of the rotor 204, according to yet another embodiment. In this embodiment, rotor core 208 includes a series of axial pads 296 along its outer surface. Axial pads 296 project from the outer surface of the rotor core 208 by approximately 0.05 mm to 0.3 mm, forming a series of axial channels 298 in between. The adhesive (not shown) is applied within the axial channels 298 on the outer surface of the rotor core 208 for retaining the magnet ring 206. The inner diameter of the magnet ring 206 is sized to be form-fittingly received in contact with the axial pads 296 to ensure a tight fit and proper alignment between the magnet ring 206 and the rotor core 208.

Referring back to FIGS. 7 and 8, motor assembly 200 includes a circuit board (hereinafter referred to as Hall board) 400 is mounted on the stator assembly 210. Hall board 400 includes a series of magnetic (Hall) sensors arranged to sense a magnetic flux of the magnet ring 206. A series of signal wires 402 are coupled to a first connector 404 that is mounted on the Hall board 400 on one end and a second connector 406 that is coupled to the controller (not shown) on the other end. The signal wires 402 provide signals related to an angular position of the rotor 204 to the controller.

Use of Hall boards for detection of the angular position of the rotor is well known. Hall boards provide signals related to the magnetic position of the rotor to a controller, which uses the information for calculating the timing of commutation of the next phase of the motor. Conventionally, a Hall board is rectangular shaped with three Hall sensors positioned at predetermined angular positions to sense the rotor rotary position. Also, conventionally, a sense magnet ring is provided in addition to the rotor magnet and mounted on the rotor shaft adjacent the rotor lamination stack. The Hall sensors are axially aligned with the sense magnet ring, and the sense magnet ring has an axial magnetic flux that is sensed by the hall sensors. Disposition of the hall board adjacent the stator, and addition of the sense magnet ring, add to overall motor length and cost of manufacturing.

Hall board 400 is described herein in detail with reference to FIGS. 15-22, according to an embodiment. In an embodiment, as described here in detail, no sense magnet ring is provided, and the Hall board 400 is designed to directly sense the leakage flux of the rotor magnet ring 206. In addition, the Hall board 400 is designed to add little or no length to the motor assembly 200. Various embodiments for coupling the hall board 400 to the stator assembly 210 are described in detail with reference to FIGS. 23-32.

Figure 16:
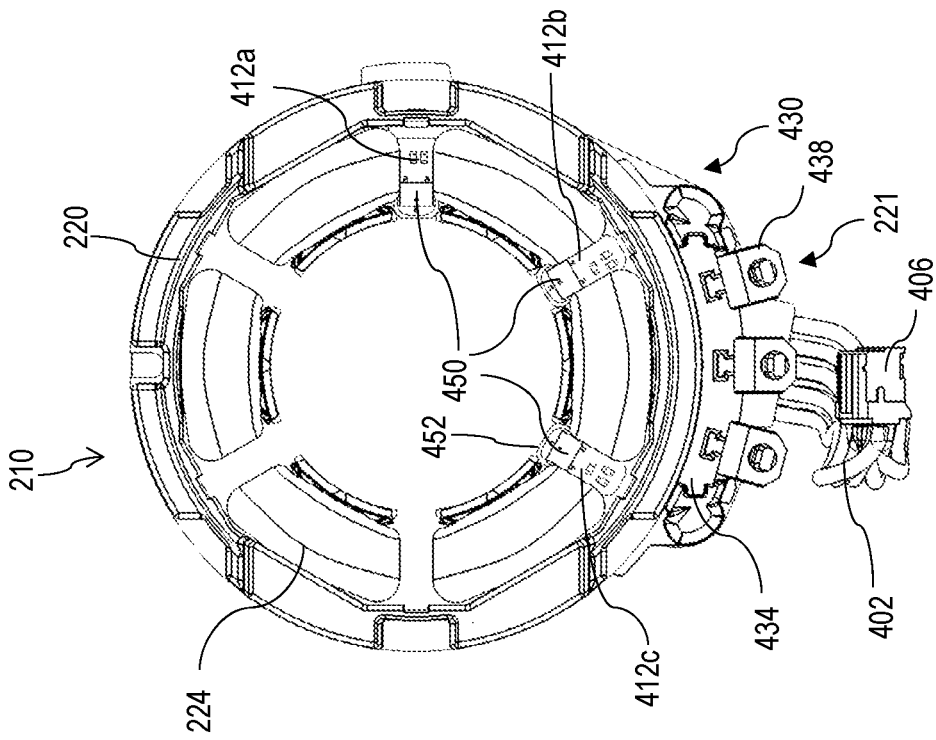
FIG. 16 depicts a front axial view of the stator assembly and the Hall board, according to an embodiment.
Figure 15:
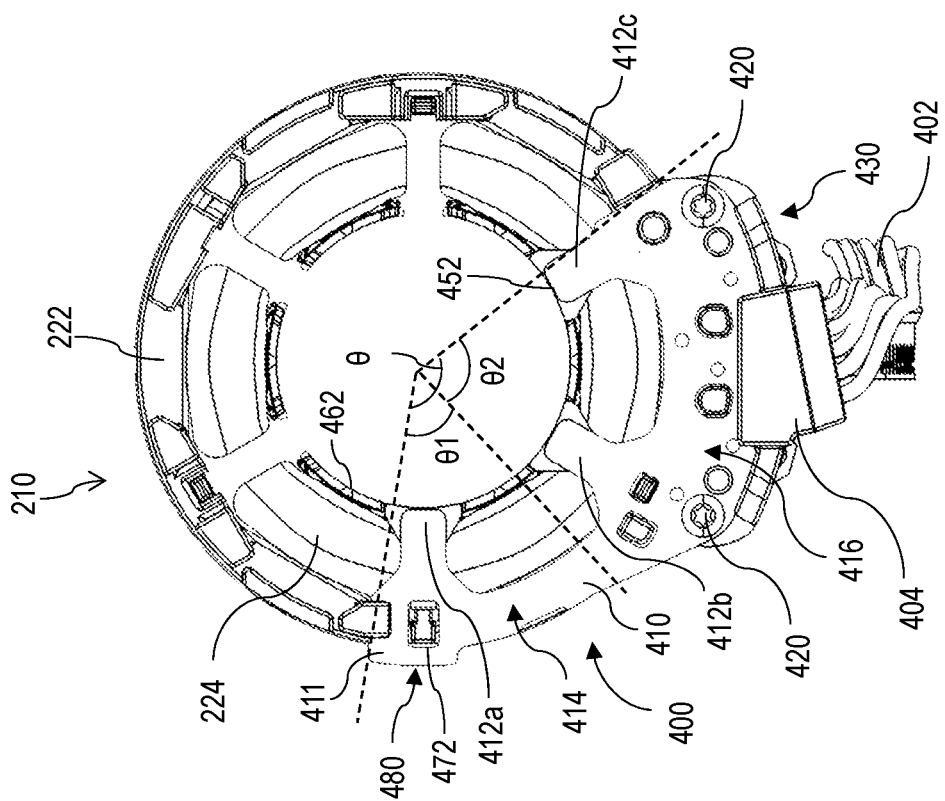
FIG. 15 depicts a rear axial view of the stator assembly and the Hall board, according to an embodiment.
Figure 17:
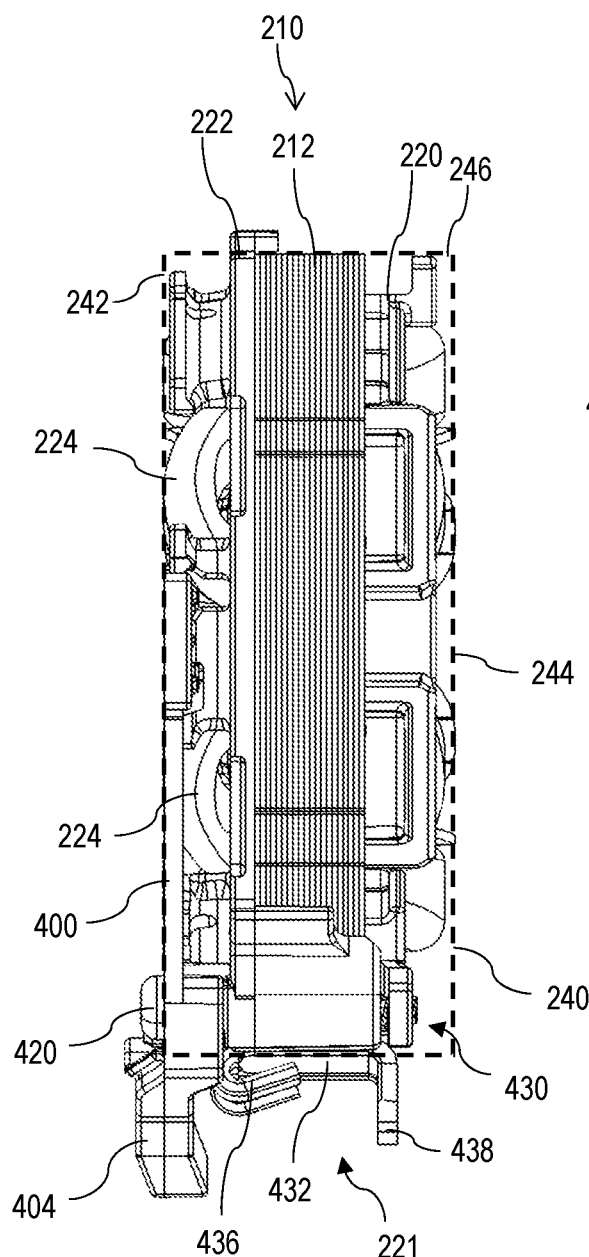
FIG. 17 depicts a side view of the stator assembly and the Hall board, according to an embodiment.
Figure 18:
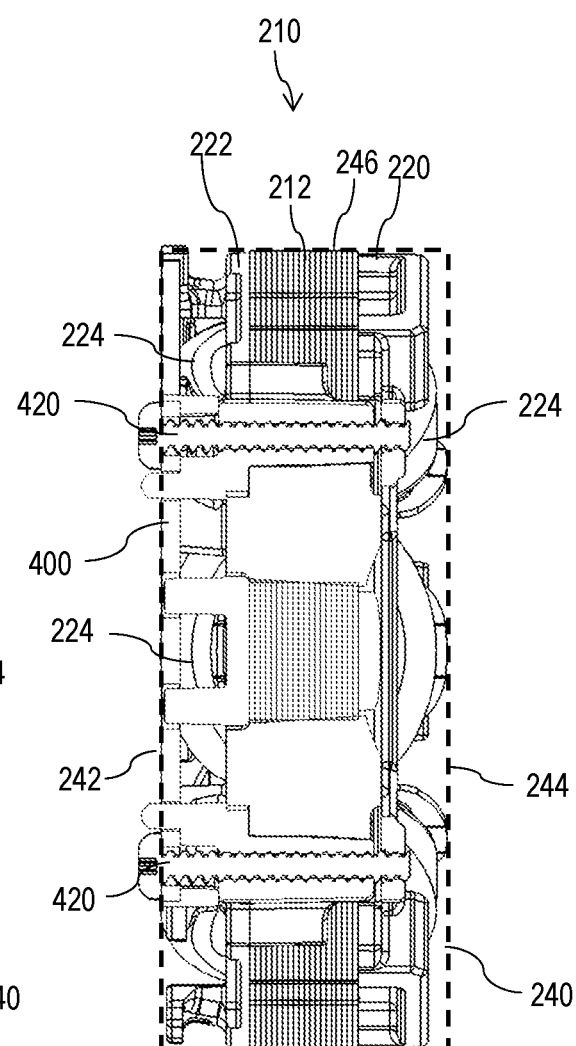
FIG. 18 depicts a cross-sectional side view of the stator assembly and the Hall board from a different angle, according to an embodiment.
Figure 19:
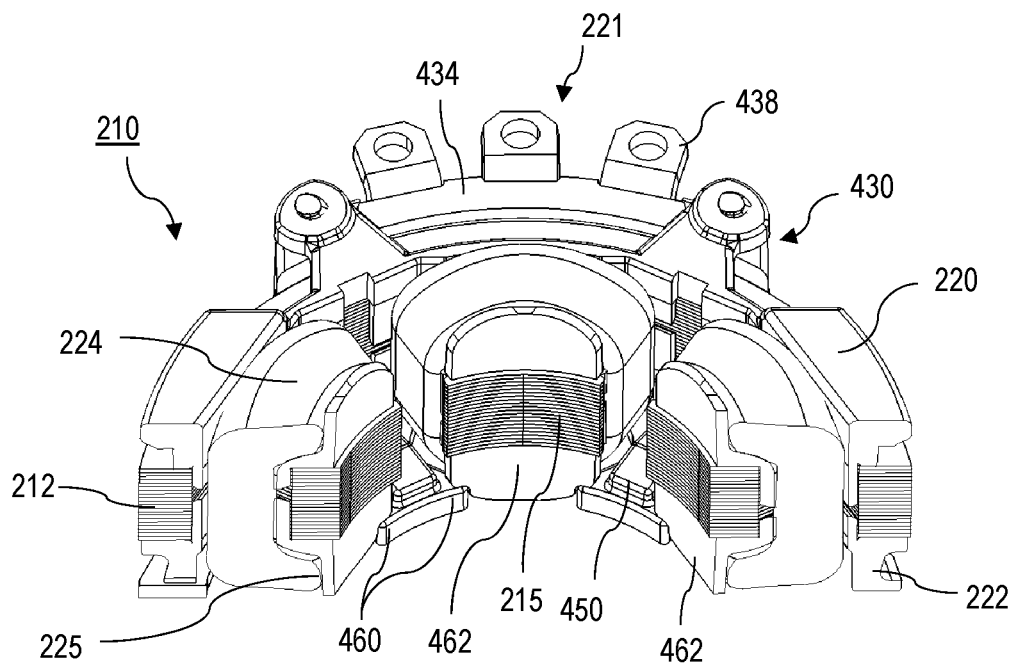
FIG. 19 depicts a cut-off perspective front view of the stator assembly and the Hall board, according to an embodiment.
Figure 20:
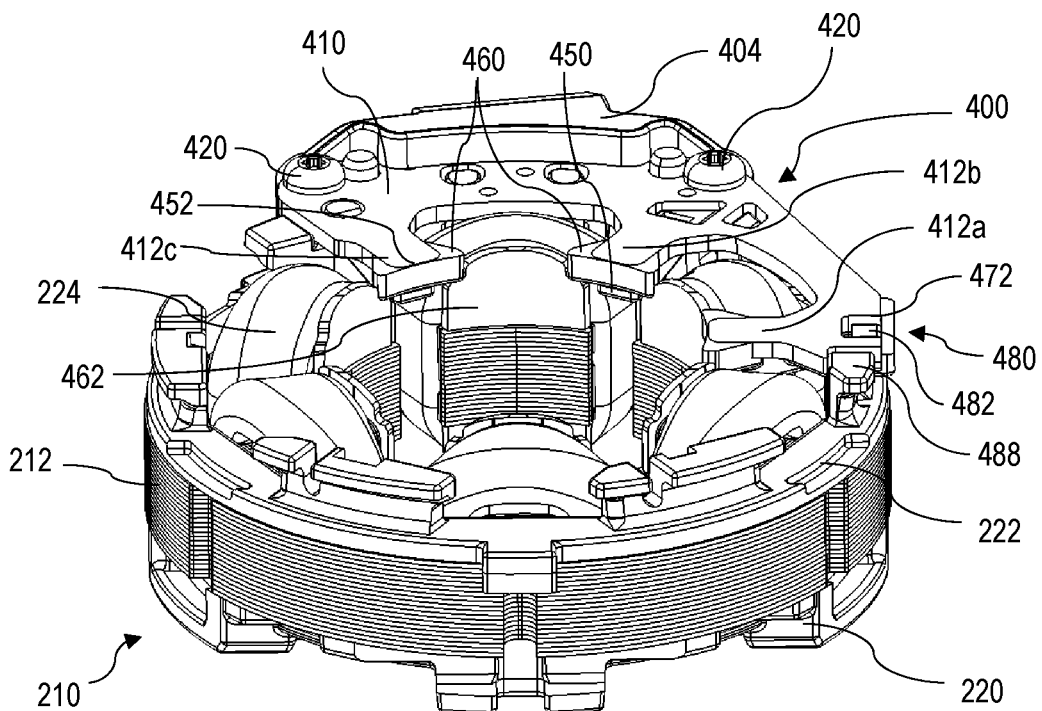
FIG. 20 depicts a rear perspective view of the stator assembly and the Hall board, according to an embodiment.

FIGS. 15 and 16 depict rear and front axial views of the stator assembly 210 and the Hall board 400, according to another embodiment. FIG. 17 depicts a side view of the stator assembly 210 and the Hall board 400, according to another embodiment. FIG. 18 depicts a cross-sectional side view of the stator assembly 210 and the Hall board 400 from a different angle, according to another embodiment. FIG. 19 depicts a cut-off perspective front view of the stator assembly 210 and the Hall board 400, according to another embodiment. FIG. 20 depicts a rear perspective view of the stator assembly 210 and the Hall board 400, according to another embodiment.

As shown in these figures, in an embodiment, the Hall board 400 includes a main body 410 that is arcuate shaped and overlays the rear surface of the end insulator 222 of the stator assembly 210, three legs 412a, 412b, 412c that extend radially inwardly from the main body 410. The legs 412a-c penetrate the stator slots formed between the ends of the stator windings 224 substantially radially in-line with the ends of the stator windings 224. In an embodiment, the main body 410 covers approximately an angular range 'θ' of the stator assembly 210, where θ is in the range of 120-140 degrees, preferably approximately 125-135 degrees, more preferably approximately 130 degrees.

In an embodiment, main body 410 of the Hall board 400 has a curvature that generally corresponds to the curvature of the stator assembly 210. In an embodiment, main body 410 is shaped such that, when viewed along the axis direction of the motor assembly 200, a first portion 414 of the main body 410 does not substantially extend beyond the periphery of the outer surface of the stator core 212. In an embodiment, first portion 414 covers an angular distance θ1 in the range of approximately 35 to 55 degrees, preferably approximately 40 to 50 degrees. In an embodiment, while a lip 411 of the first portion 414 along the leg 412a slightly protrudes beyond the periphery of the outer surface of the stator core 212, the remainder of the first portion 414 is substantially contained within a peripheral envelope of the stator core 212.

In an embodiment, a second portion 416 of the peripheral surface of the main body 410, however, does extend beyond the periphery of the outer surface of the stator core 212 to provide a mounting area for the first connector 404 and receiving through-holes for fasteners 420. In an embodiment, the second portion 416 covers an angular distance θ2 in the range of approximately 60 to 90 degrees, preferably approximately 70 to 80 degrees. In an embodiment, the second portion 416 radially intersects legs 412b and 412c.

In an embodiment, the two fasteners 420 are received through corresponding through-holes of the Hall board 400 and the rear end insulator 222 and received into threaded receptacles of the front end insulator 220 in order to secure the Hall board 400 is secured to the stator assembly 210.

In an embodiment, front and rear end insulators 220 and 222 together form a mounting support structure 430 that project radially outwardly from the stator assembly 210 and securely supports the terminal block 221 on the outer surface of the stator core 212. In an embodiment, the through holes of the end insulator 222 and threaded receptacles of the front end insulator 220 are provided on the mounting support structure 430. In an embodiment, the terminal block 221 is thus provided adjacent the first connector 404 of the Hall board 400.

In an embodiment, terminal block 221 includes a series of three motor terminals 432 provided parallel to the longitudinal axis of the motor and mounted on an insulating mount 434. Each of the motor terminals 432 includes a folded tang portion 436 around which the magnet wires of the corresponding stator windings 224 are wrapped and fused, and a tab portion 438 to which the corresponding power wires are coupled. U.S. Pat. No. 9,819,241, which is incorporated herein by reference in its entirety, provides a full description of terminal block 221. In an embodiment, second portion 416 of the main body 410 has a periphery that extends in line with the insulating mount 434 so as to position the first connector 404 substantially in line with the tab portions 438 of the motor terminals 432.

In an embodiment, second portion 416 of the Hall board 400, together with the terminal block 221, may be received partially within the handle 13 of the power tool below the motor housing portion 23. The orientation of the first portion 414 of the Hall board 400 within the circumferential envelope of the stator core 212 ensures that the Hall board 400 does not increase the overall girth of the motor assembly 200 within the motor housing portion 23.

In an embodiment, legs 412a-c of the Hall board 400 penetrate in between the ends of the stator windings 224 and the main body 410 is mounted in contact with the end insulator 222. As best shown in the side views of FIGS. 17 and 18, this arrangement allows the Hall board 400 to be positioned in the radial position approximately within motor envelope 240 (see FIG. 5), with legs 412a-412c being contained fully within the motor envelope 240. Motor envelope 240 in this embodiment is bound by rear plane 242 at a rearmost point of the stator windings 224, front plane 244 at a frontmost point of the stator windings 224, and generally cylindrical boundary 246 surrounding the radially outermost portion of the stator assembly 210 not including the terminal block 211. In an embodiment, at least a portion of the Hall board 400 opposite the stator core 212 is positioned along approximately the rear plane 242, which intersects the rear ends of the stator windings 224. In an embodiment, the rear surface of the Hall board 400 opposite the stator core 212 is positioned along approximately the rear plane 242.

This arrangement eliminates or substantially reduces any contribution by the Hall board 400 to the overall size and length of the motor assembly 200. In compact motor applications such as cordless power tools, where significant research and development is dedicated to optimizing the power density of the motor, a reduction is length of even a few millimeters is significant.

In an embodiment, mounted on the front surface of the Hall board 400 facing the rotor 204 are a series of three Hall sensors 450 disposed near the inner ends 452 of the three legs 412a-c. In an embodiment, the Hall sensors 450 are positioned circumferentially in-line with inner ends of the stator teeth 214 or inner ends of the stator windings 224 when viewed along the axis direction, as best seen in FIGS. 15, 16, 19 and 20. In an embodiment, the inner ends 452 of the legs 412a-c are circumferentially in-line with inner ends 215 of the stator teeth 214 and Hall sensors 450 are circumferentially in-line with inner portions 225 of the stator windings 224. This arrangement positions the Hall sensors 450 sufficiently close to the rotor magnet ring 206 for direct sensing of the rotor magnet ring 206 without a need for an additional sense magnet, thus further reducing the axial length of the motor assembly 200.

In an embodiment, an overmold or glue material 460 on two sides of the legs 412a-c of the Hall board 400 near the inner ends 452 to secure the legs 412a-c to teeth portions 462 of the end insulator 222 of the stator assembly 210. This ensures that the legs 412a-c of the Hall board 400 are protected against damage due to vibration.

Figure 21:
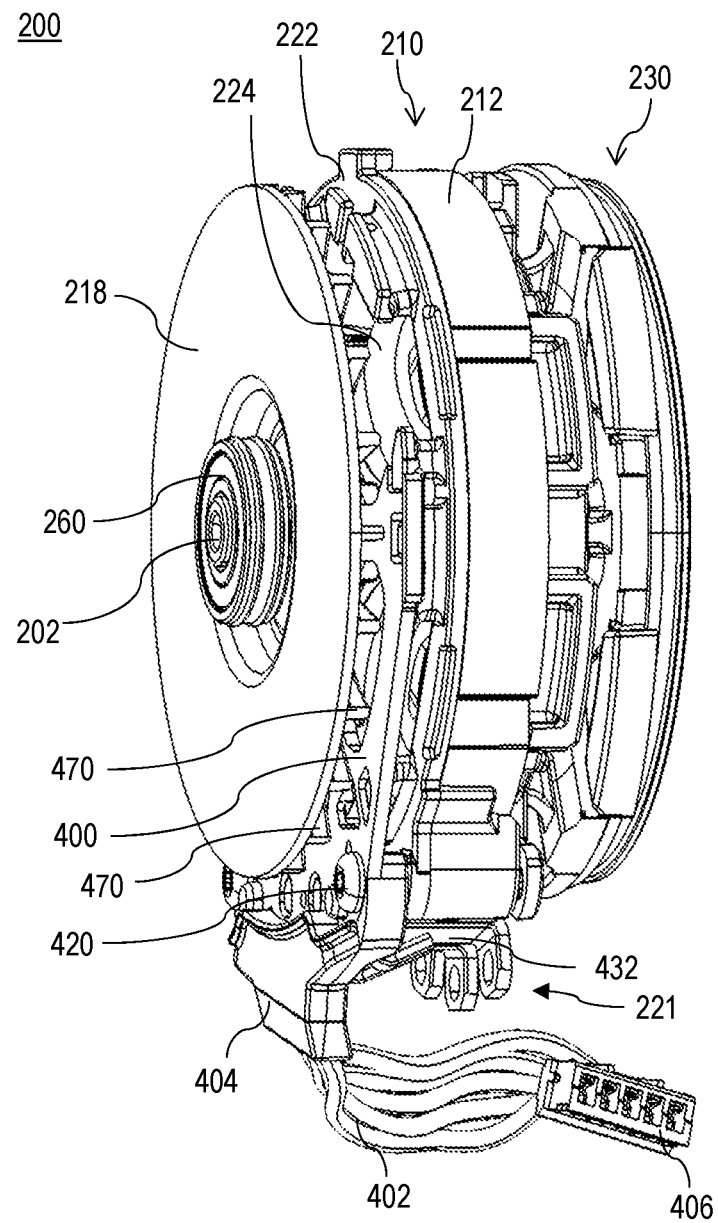
FIG. 21 depicts a perspective view of the motor assembly including the fan and support plate, according to an embodiment.
Figure 22:
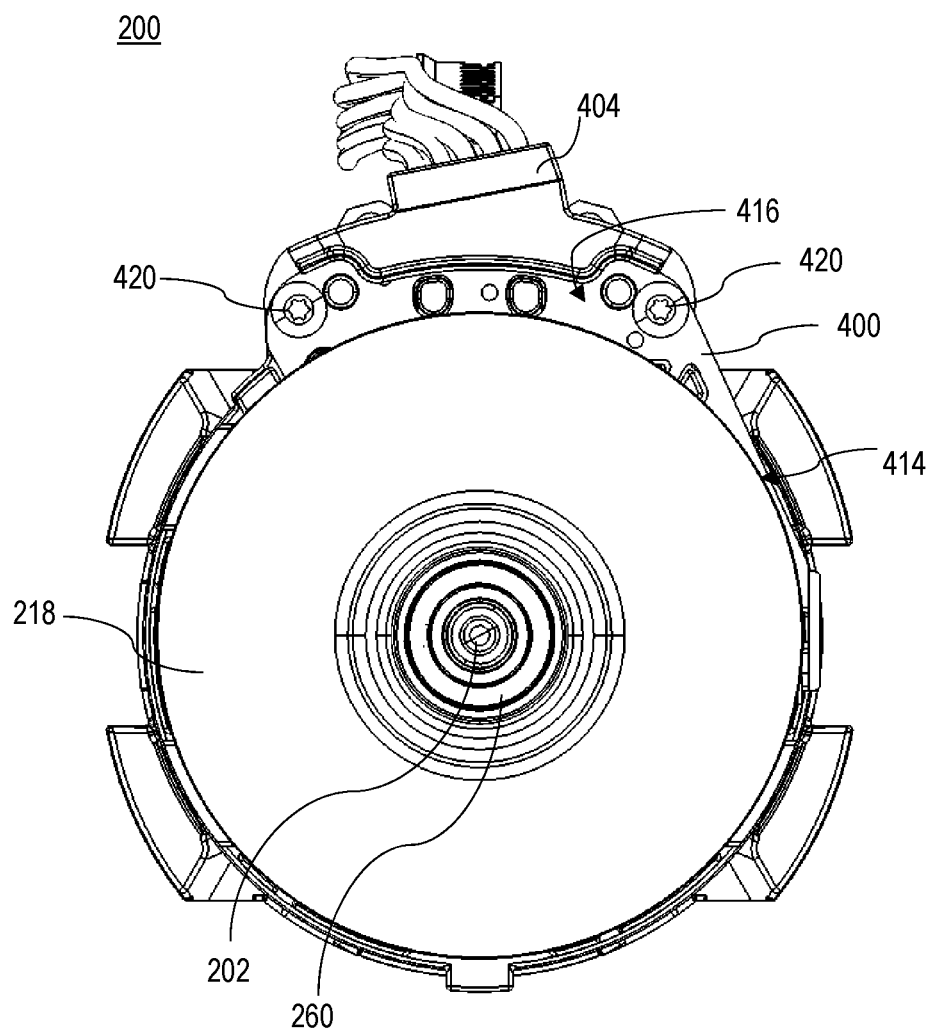
FIG. 22 includes a rear view of the motor assembly including the fan 18, according to an embodiment.

FIG. 21 depicts a perspective view of the motor assembly 200 including the fan 218 and support plate 230, according to an embodiment. FIG. 22 includes a rear view of the motor assembly 200 including the fan 218, according to an embodiment.

In an embodiment, connector 404 and fasteners 420 are provided on the second portion 416 of the Hall board 400, outside the peripheral area of the motor fan 218. Heads of the fasteners 420, which may have a thickness of 1 mm or more, and the connector 404, are elements associated with Hall board 400 that project slightly rearwardly of the Hall board 400 in the axial direction. However, since the connector 404 and fasteners 420 are positioned outside the peripheral area of the motor fan 218, the motor fan 218 may be positioned in close axial proximity to the Hall board 400, with fan blades 470 rotatably positioned in very close proximity to the rear surface of the Hall board 400. In an embodiment, the distance between the fan blades 470 and the Hall board 400 is approximately 1.5 mm or less. This allows the Hall board 400 to be secured to the stator assembly 210 without increasing the relative distance between the motor fan 218 and the stator assembly 210.

Referring back to FIGS. 15 and 20, while fasteners 420 sufficiently secure legs 412b and 412c of the Hall board 400 relative to the stator assembly 210, leg 412a is provided at a distance from both fasteners 420 and is therefore prone to movement and breakage due to high vibration without an additional retention feature in its vicinity. To overcome this, in an embodiment, a slot 472 is provided on the main body 410 of the Hall board 400 radially outwardly of the leg 412a that receives a snap post 482 of the rear end insulator 222. Moreover, a retention feature 480 is provided to mechanically secure the snap post 482 of the rear end insulator 222 to the Hall board 400 proximate the slot 472. In an embodiment, retention feature 480 is designed to allow a snap connection or sliding connection between the Hall board 400 and the snap post 482 of the rear end insulator 222, without adding the length of the motor assembly 200. In an embodiment, retention feature 480 may be made as a detachable or inseparable snap-fit connection.

Figure 23:
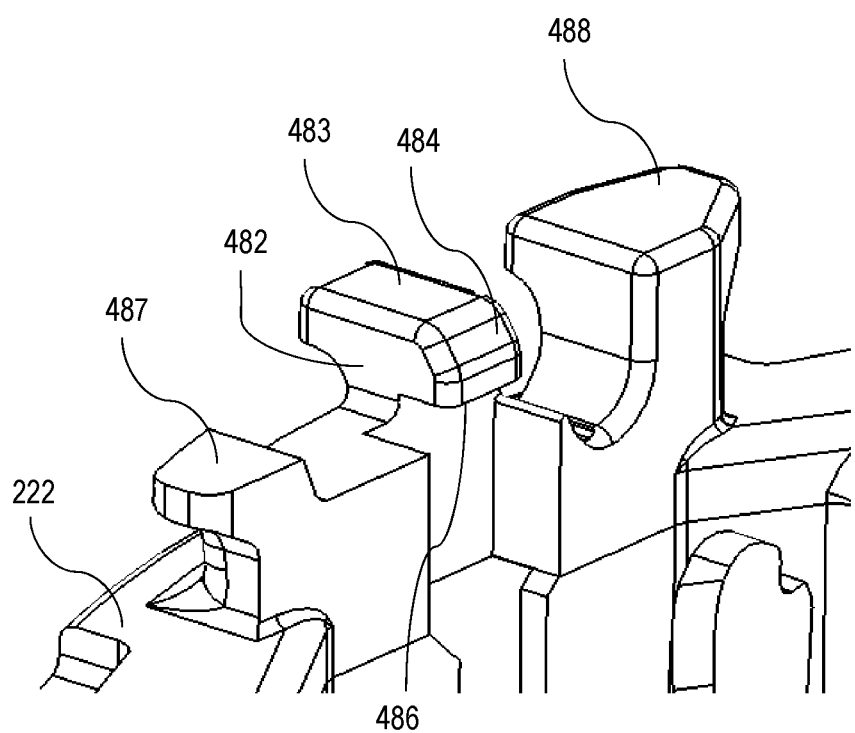
FIG. 23 depicts a partial perspective view of the end insulator including a snap post, according to an embodiment.

FIG. 23 depicts a partial perspective view of the rear end insulator 222, according to an embodiment. In an embodiment, snap post 482 of the rear end insulator 222 that extends along the longitudinal axis of the motor assembly 200. In an embodiment, snap post 482 includes a snap head 483 that is received within the slot 472 of the Hall sensor as the Hall board 400 is being mounted on the end insulator 222, an entrance side 484 for sliding engagement with the retention feature 480 as the snap head 483 is being received within the slot 472, and an undercut portion 486 that makes a snap-fit connection with the retention feature 480 once the snap head 483 is fully received within the slot 472 to secure the Hall board 400. In an embodiment, retention feature 480 is designed to allow the snap-fit connection to be made at approximately the front surface of the Hall board 400 so as to avoid adding any length to the rear surface of the Hall board 400.

In an embodiment, rear end insulator 222 further includes an inner post 487 disposed on one side of the snap post 482 having a flat end surface on which the front surface of the Hall board 400 rests when the retention feature 480 makes a snap connection with the snap post 482. In addition, in an embodiment, rear end insulator 222 also includes an outer post 488 disposed on the other side of the snap post 482 to engage a radial end wall of the Hall board 400 next to the slot 427.

Figure 24A:
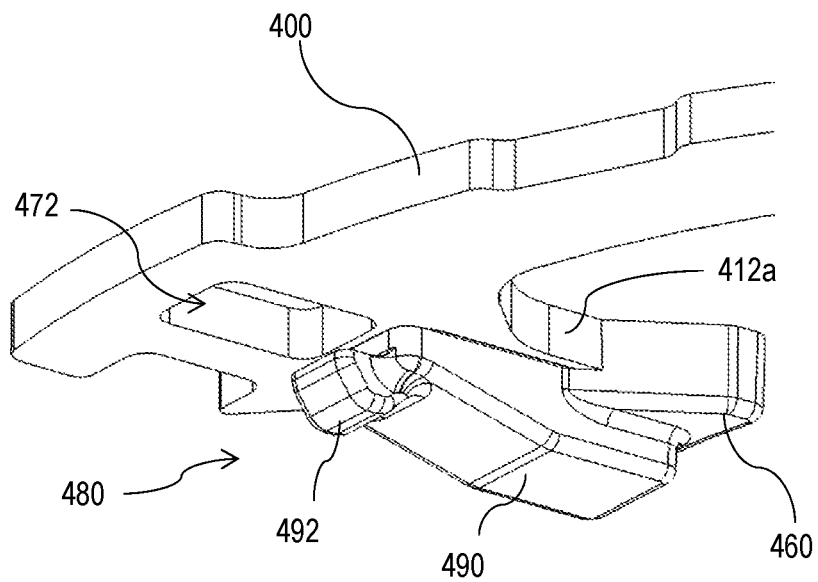
FIG. 24A depicts a partial perspective view of the Hall board, depicting a first embodiment of the retention feature.
Figure 24B:
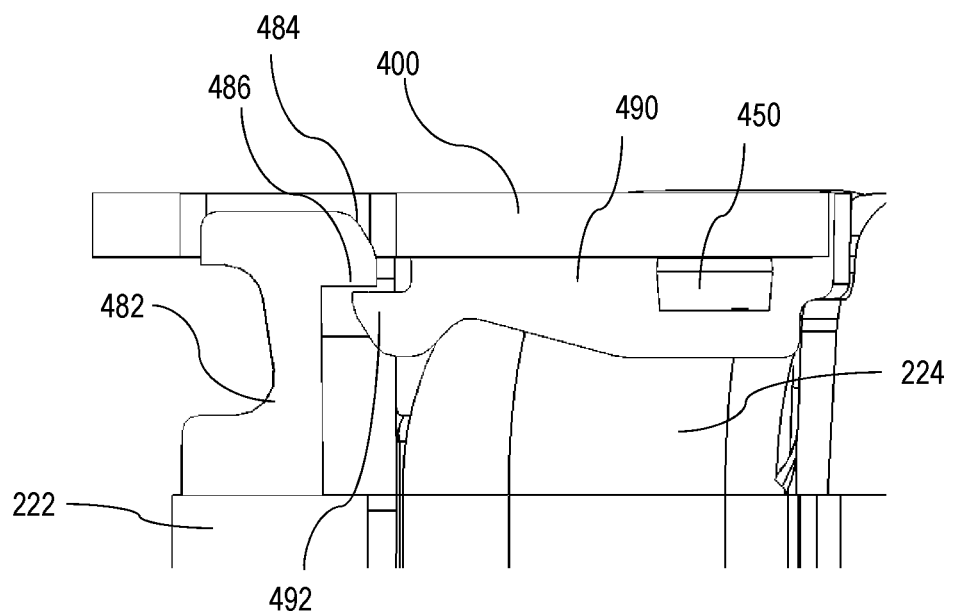
FIG. 24B depicts a partial side cross-sectional view of the Hall board with retention feature in engagement with snap post of rear end insulator, according to the first embodiment.

FIG. 24A depicts a partial perspective view of the Hall board 400, depicting the retention feature 480 for making a snap-fit connection with the snap post 482, according to a first embodiment. FIG. 24B depicts a partial side cross-sectional view of the Hall board 400 with retention feature 480 in engagement with snap post 482 of the end insulator 222, according to the first embodiment.

In this embodiment, retention feature 480 further includes a molded structure 490 disposed on the front surface of the leg 412a of the Hall board 400. In an embodiment, molded structure 490 may be made of resin or plastic-based material provided via overmolding, injection-molding, and similar processes. In an embodiment, molded structure 490 covers Hall sensor 450 on the front surface of the leg 412a of the Hall board 400. In an embodiment, molded structure 490 is provided integrally with overmold layer 460 molded in a single step. In an embodiment, molded structure 490 includes a lip 492 arranged to engage the undercut portion 486 of the snap post 482. In an embodiment, the lip 492 is arranged at a distance from the front surface of the Hall board 400, with at least a portion of the lip 492 covering a portion of the slot 472 along the radial direction. In an embodiment, the lip 492 makes a snap-fit connection with the snap post 482 proximate the front surface of the Hall board 400. In this manner, the snap post 482 is received within the slot 472, but it does not project out of the slot 472 over the rear surface of the Hall board 400.

Figure 25A:
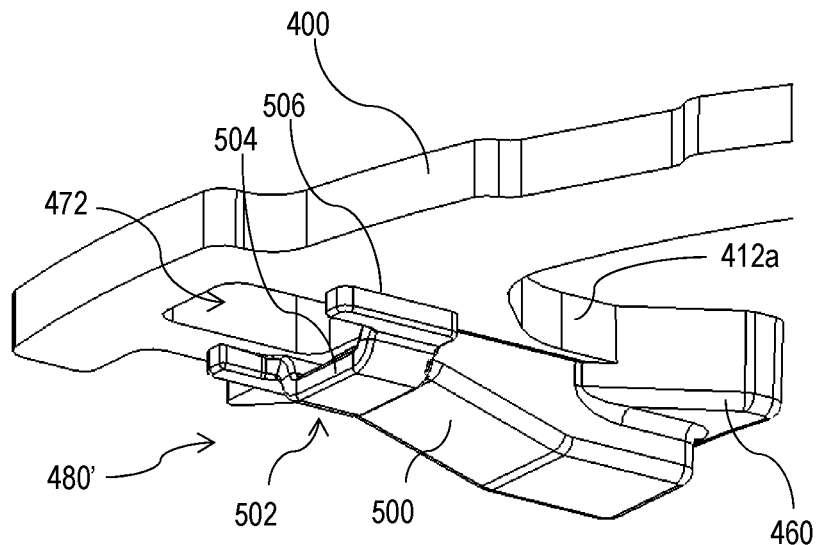
FIG. 25A depicts a partial perspective view of the Hall board, depicting a second embodiment of the retention feature.
Figure 25B:
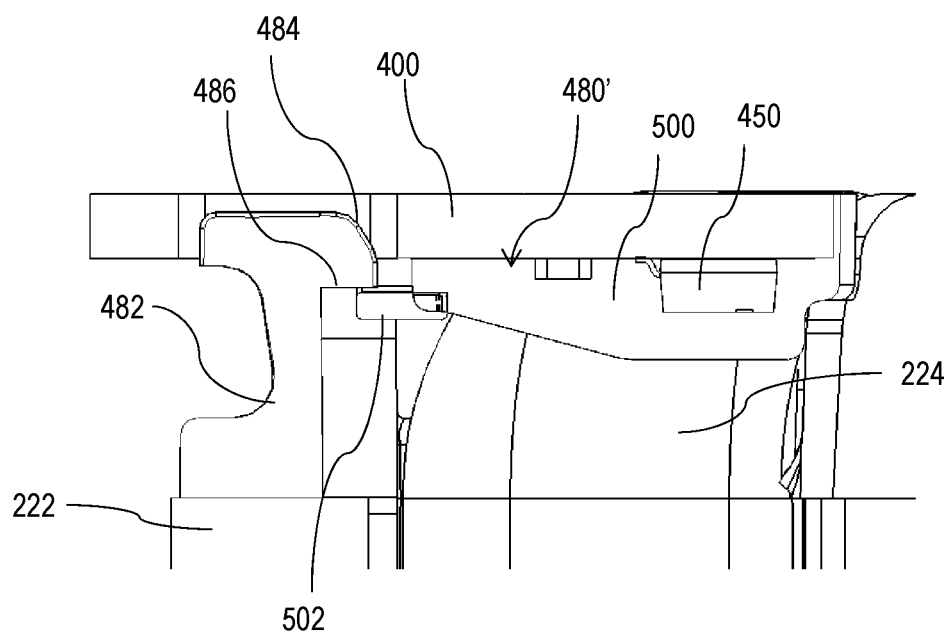
FIG. 25B depicts a partial side cross-sectional view of the Hall board with retention feature in engagement with snap post of the rear end insulator, according to the second embodiment.

FIG. 25A depicts a partial perspective view of the Hall board 400, depicting retention feature 480' according to a second embodiment. FIG. 25B depicts a partial side cross-sectional view of the Hall board 400 with retention feature 480' in engagement with snap post 482 of the end insulator 222, according to the second embodiment.

In this embodiment, retention feature 480' includes a molded structure 500 similar to the first embodiment described above, but instead of a lip provided as a part of the molded structure 500, the molded structure 500 supports a metal trap 502. In an embodiment, metal trap 502 includes a U-shaped cross-sectional profile having a main body 504 and two legs 506. The legs 506 of the metal trap 502 are mounted on the front surface of the Hall board 400 via the molded structure 500. In an embodiment, the main body 504 is arranged at a distance from the front surface of the Hall board 400, with at least a portion of the main body 504 covering a portion of the slot 472 along the radial direction. In an embodiment, the main body 504 makes a snap-fit connection with the snap post 482 proximate the front surface of the Hall board 400. In this manner, the snap post 482 is received within the slot 472, but it does not project out of the slot 472 over the rear surface of the Hall board 400.

Figure 26:
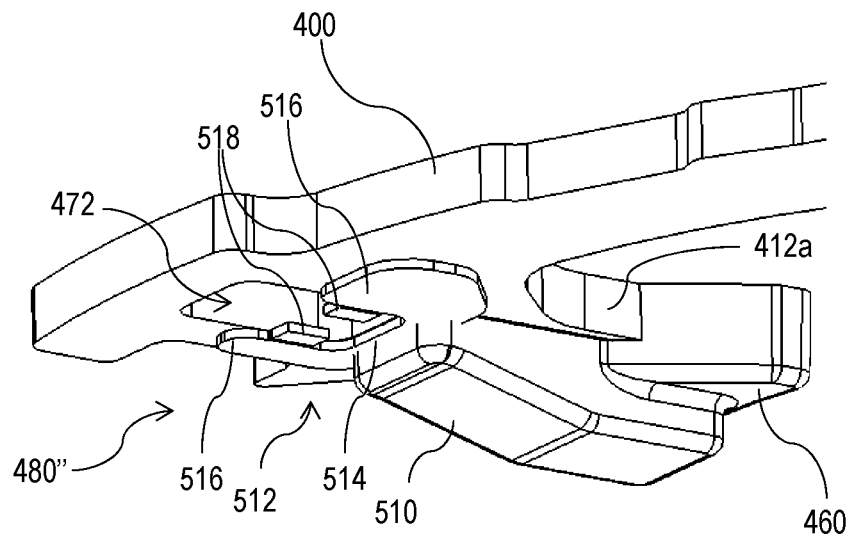
FIG. 26 depicts a partial perspective view of the Hall board, depicting a third embodiment of the retention feature.

FIG. 26 depicts a partial perspective view of the Hall board 400, depicting retention feature 480" according to a third embodiment. In this embodiment, retention feature 480" includes a molded structure 510 similar to the first two embodiments described above, but instead of a molded lip or a U-shaped metal trap, the molded structure 510 supports a planar place pad 512. In an embodiment, place pad 512 engages a snap post 482" that includes two laterally projecting side lips 520 on the top portion 482" instead of a radially oriented retraction side.

Figure 27:
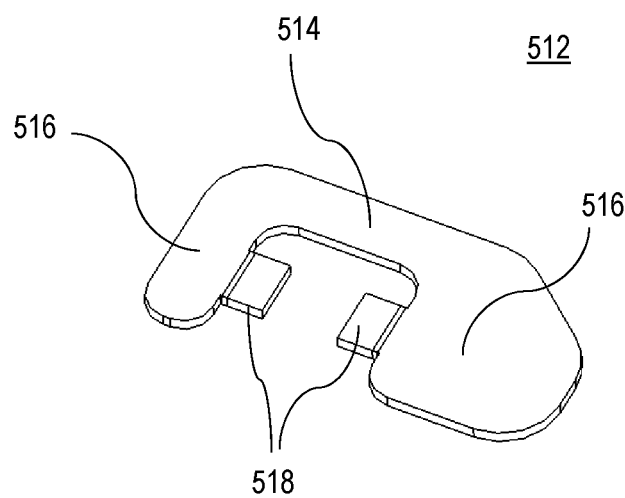
FIG. 27 depicts a perspective view of the place pad of the third embodiment, according to an embodiment.

FIG. 27 depicts a perspective view of the place pad 512, according to an embodiment. In an embodiment, place pad 512 is made of sheet metal shaped to include a U-shaped planar body including an inner main body 514 and two outwardly projecting legs 516. In an embodiment, the main body 514 is secured in contact with the front surface of the Hall board 400 along the leg 412*a*. The main body 514 is secured against the Hall board 400 via the overmold structure 510. In an embodiment, the legs 516 extend from the main body 514 around the slot 472. Legs 516 include oppositely arranged snaps 518 that project laterally to cover a portion of the slot 472. In an embodiment, snaps 518 are resiliently flexible and bendable relative to the legs 516.

Figure 28A:
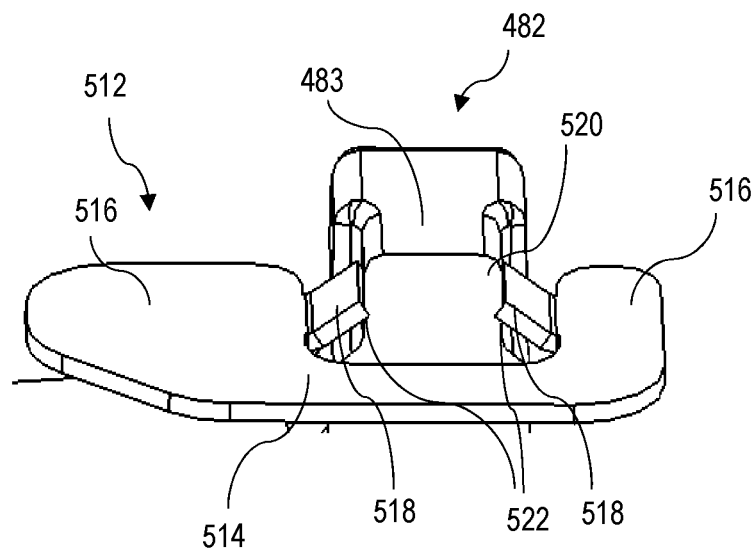
FIG. 28A depicts a partial perspective view of the place pad and snap post, according to an embodiment.
Figure 28B:
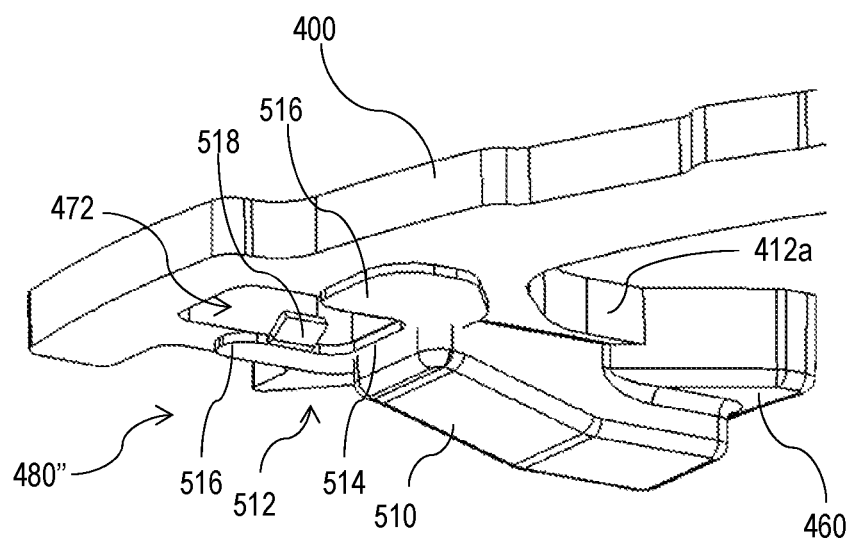
FIG. 28B depicts a perspective view of the Hall board, depicting the plate pad in a bent position, according to an embodiment.

FIG. 28A depicts a partial perspective view of the place pad 512 and snap post 482", according to an embodiment. In an embodiment, as the snap post 482" is moved in the direction of slot 472 of the Hall board 400, the snaps 518 of the place pad 512 engage the side lips 520 of the snap post 482" and bend upwardly into the slot 472. This is illustrated in the perspective view of FIG. 28B, where the place pad 512 is depicted without the snap post 482". As the snap post 482" is received within the slot 472, the snaps 518 spring inside valleys 522 formed under the lips 520, thus securely engaging the underside of the lips 520. In this manner, the main body 504 makes a snap-fit connection with the snap post 482" proximate the front surface of the Hall board 400, allowing the snap post 482" to be received within the slot 472 without projecting out of the slot 472 over the rear surface of the Hall board 400.

Figure 29:
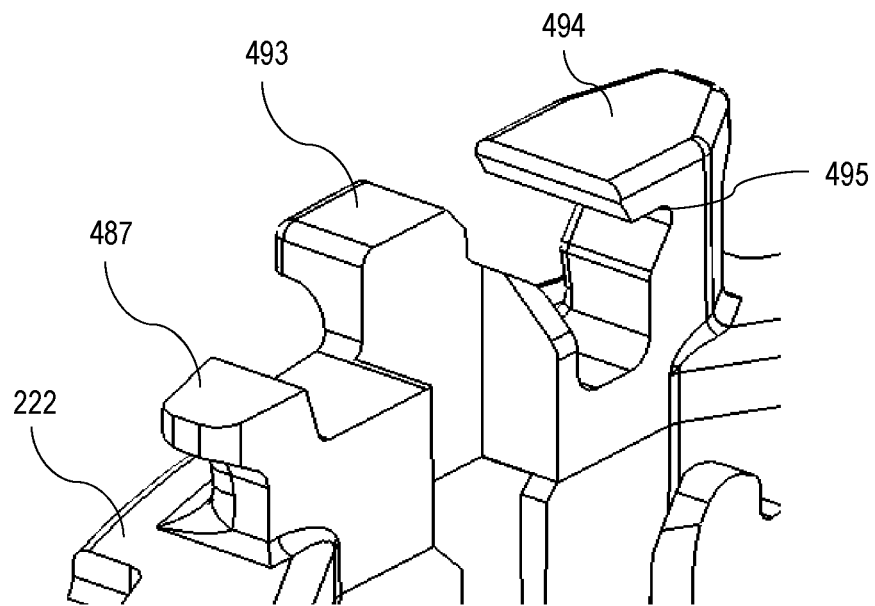
FIG. 29 depicts a partial perspective view of the end insulator including a clip post, according to an embodiment.

FIG. 29 depicts a partial perspective view of the end insulator 222 including a clip post 494, according to an embodiment. In this embodiment, placement post 493, which is positioned to be received within the slot 472 of the Hall board 400, does not include a snapping feature. Instead, clip post 494 provided adjacent the placement post 493, with a recess 495 formed facing the placement post 493. Recess 495 is designed to engage a clip 496 of the Hall board 400 described below.

Figure 30:
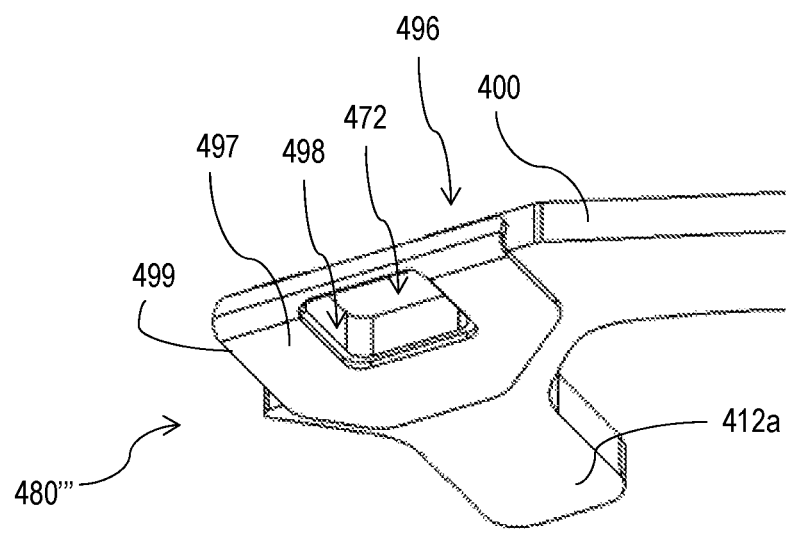
FIG. 30 depicts a perspective frontal view of the Hall board depicting a fourth embodiment of the retention feature in the form of a clip.

FIG. 30 depicts a perspective frontal view of the Hall board 400 depicting a fourth embodiment of the retention feature 480''' in the form of the clip 496. In an embodiment, clip 496 includes a main planar body 497 mounted on the front surface of the Hall board 400 and having an opening 498 that aligns with the slot 472 of the Hall board 400. A engagement edge 499 of the clip 496 extends beyond the radial end wall of the Hall board 400. The clip 496 may be secured to the Hall board 400 by, for example, soldering, fastening, or other known method.

Figure 31A:
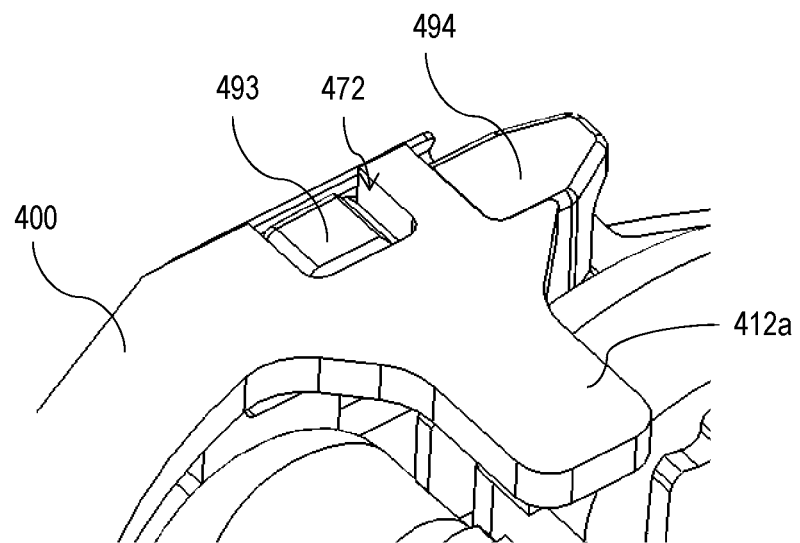
FIG. 31A depicts a perspective view of the Hall board secured to the clip post of the insulator via the clip, according to an embodiment.
Figure 31B:
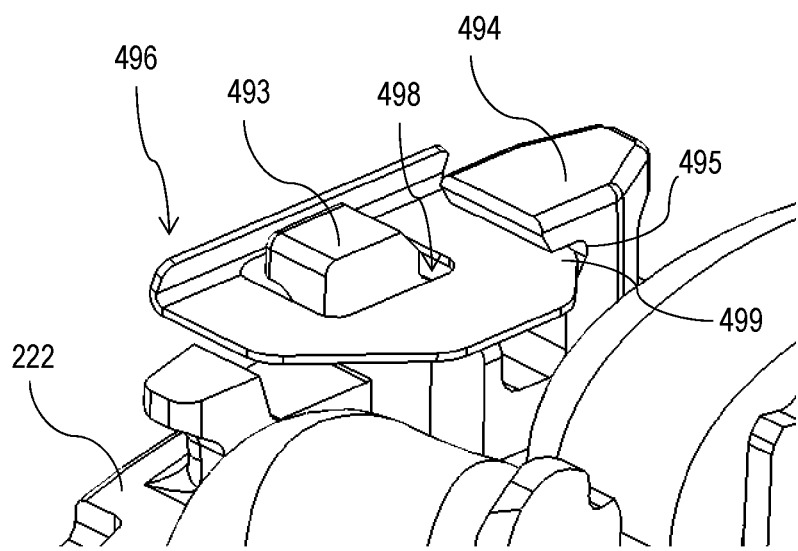
FIG. 31B depicts a perspective view of the clip secured to the clip post of the insulator depicted without the Hall board, according to an embodiment.

FIG. 31A depicts a perspective view of the Hall board 400 secured to the clip post 494 of the rear end insulator 222 via the clip 496, according to an embodiment. FIG. 31B depicts a perspective view of the clip 496 secured to the clip post 494 of the rear end insulator 222 depicted without the Hall board 400, according to an embodiment. In an embodiment, the Hall board 400 is mounted at an angle relative to the rear end insulator 222 as the engagement edge 499 of the clip 496 is positioned within the recess 495 of the clip post 494. The Hall board 400 is pivoted around the engagement edge 499 as the placement post 493 is received within the opening 498 of the clip 496 and the slot 472 of the Hall board 400. Once the fasteners 420 (FIG. 21) are fastened to the rear end insulator 222, the placement post 493 and the clip post 494 cooperate to structurally support and secure the Hall board 400 proximate the leg 412*a*.

The above-described embodiments disclose a Hall board designed for sensed brushless DC motor control that does not increase the length of the motor. The Hall sensors 450 magnetically sense the magnetic flux of the rotor magnet ring 206 as the rotor 204 is rotated. That information is sent to the controller (not shown), which in turn measures the angular position of the rotor 204 based on the sensor information and controls the commutation of the motor according to the angular position.

It should be understood, however, that other aspects and embodiments of the invention may be utilized using a motor assembly without a Hall board, i.e., a BLDC motor that is sensorlessly controlled. Examples of sensorless motor commutation control are six-step trapezoidal commutation using the induced motor voltage signals, sinusoidal control, and field-orientated control. Reference is made to U.S. patent application Ser. No. 16/896,504 filed Jun. 9, 2020, for a description of sensorless sinusoidal and field-oriented motor control. Also, reference is made to U.S. application Ser. No. 16/530,090 filed Apr. 20, 2020, for a description of sensorless motor control using the motor induced voltage. An advantage of the Hall board design described in this disclosure is that it allows sensed trapezoidal control of a compact motor that is volumetrically equivalent to a sensorless motor capable of outputting the same power performance. However, other aspects of the invention, for example, the nested support plate, the rotor assembly, and the rear end cap design described below, may be implemented for use with a sensorless brushless motor.

Another aspect of the invention is described here with reference to FIGS. 32-39.

In the embodiment of FIG. 2 described above, proper alignment of the rear motor bearing 258, the rear tool cap 54, and the power tool housing 52 may be difficult to achieve. In one implementation, the rear motor bearing 258 is received within the rear tool cap 54, the rotor 204 is mounted within the stator assembly 210, and the motor assembly 200 and rear tool cap 54 sub-assembly is disposed within the clamshells that form the tool housing 52. The rear tool cap 54 must be fastened to the clamshells of the tool housing 52 against the magnetic force of the magnet ring 206 interacting with stator windings 224, which force the rear rotor bearing 54 to be offset with respect to the center axis of the motor assembly 200. Moreover, since the housing 52 is often made of plastic, reliance on the housing 52 for location and alignment the motor assembly 200 relative to rear tool cap 54 and the rear motor bearing 258 adds to stack-up tolerances, increases the chance of stack rub, and limits nominal airgap.

According to an embodiment of the invention, as described below in detail, the rear tool cap of the power tool is designed to support the rear motor bearing directly with respect to the stator assembly, independently of the tool housing. In an embodiment, alignment features for piloting and alignment of the stator assembly are added to the rear tool cap, allowing the rear tool cap to directly interface with the stator assembly even prior to assembly into the tool housing. By tuning the rotor bearing pocket of the rear tool cap relative to the stator assembly rather than the housing, concentricity of the rotor outer diameter to stator inner diameter greatly improves, as the tool housing as well as some motor assembly components do not contribute to radial stack-up.

Figure 32:
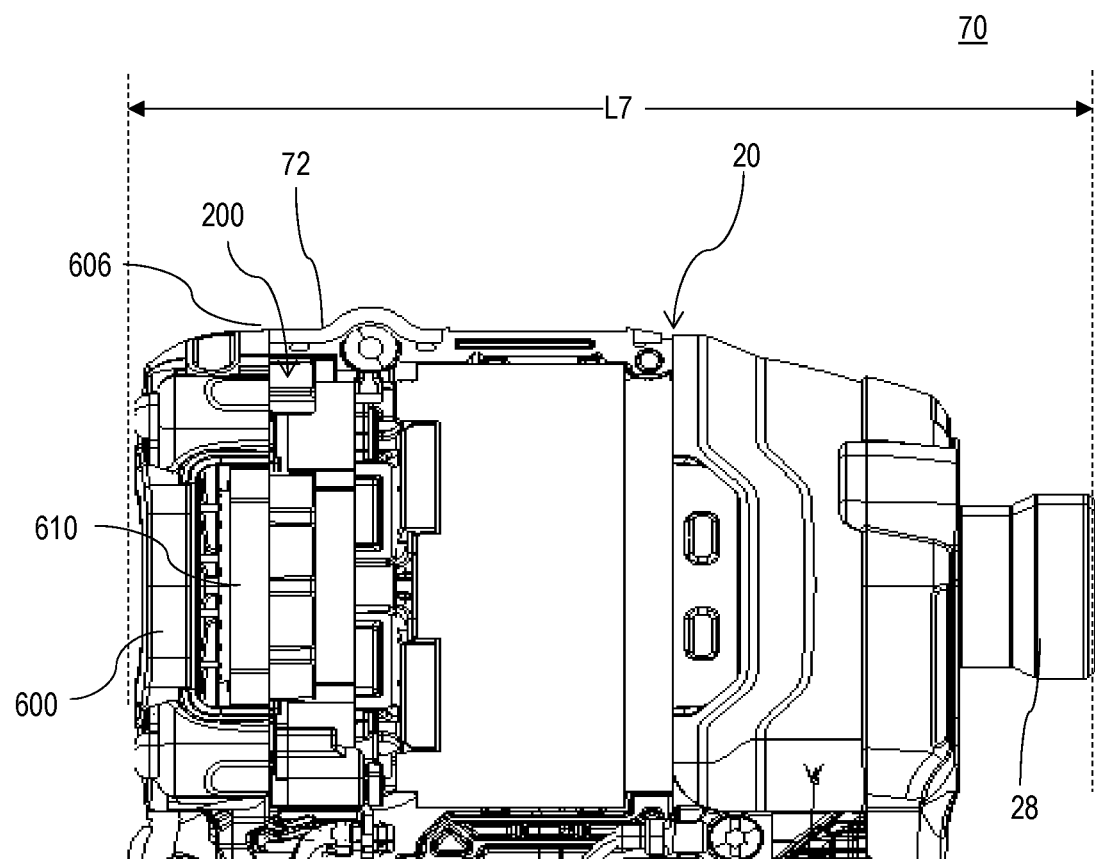
FIG. 32 depicts a side view of a third embodiment of a power tool including an improved rear tool cap provided for interfacing with the motor assembly, according to an embodiment.

FIG. 32 depicts a side view of the power tool 70 including an improved rear tool cap 600 provided for interfacing with the motor assembly 200, according to an embodiment. In an embodiment, power tool 70 includes a tool housing 72 that includes two clamshells that come together to house at least a portion of the motor assembly 200, and rear tool cap 600 is mounted to the end of the housing 72 that also houses a portion of the motor assembly 200. In an embodiment, power tool 70 is similar in many respects to power tools 10 and 50 of FIGS. 1 and 2, including a transmission assembly 20 and impact mechanism 50 forward of the motor assembly 200, a handle, etc., the description of which are not repeated here.

Figure 33:
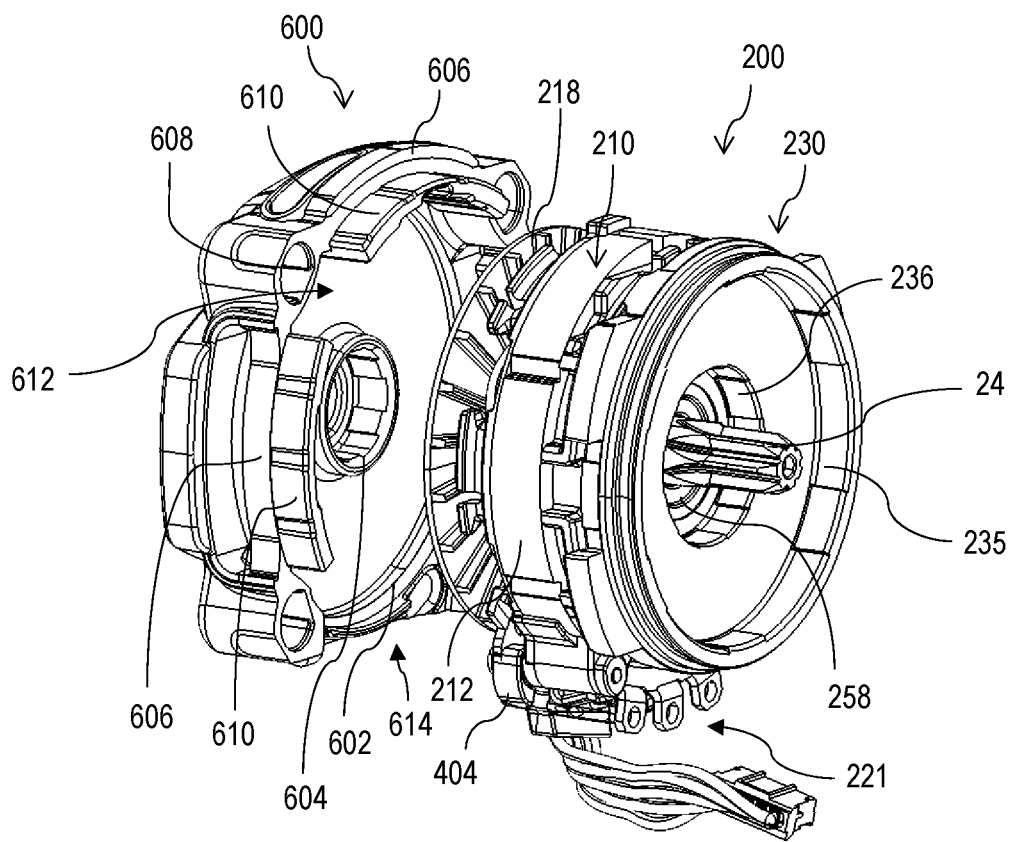
FIG. 33 depicts a perspective exploded view an improved rear tool cap provided for interfacing with the motor assembly, according to an embodiment.
Figure 34:
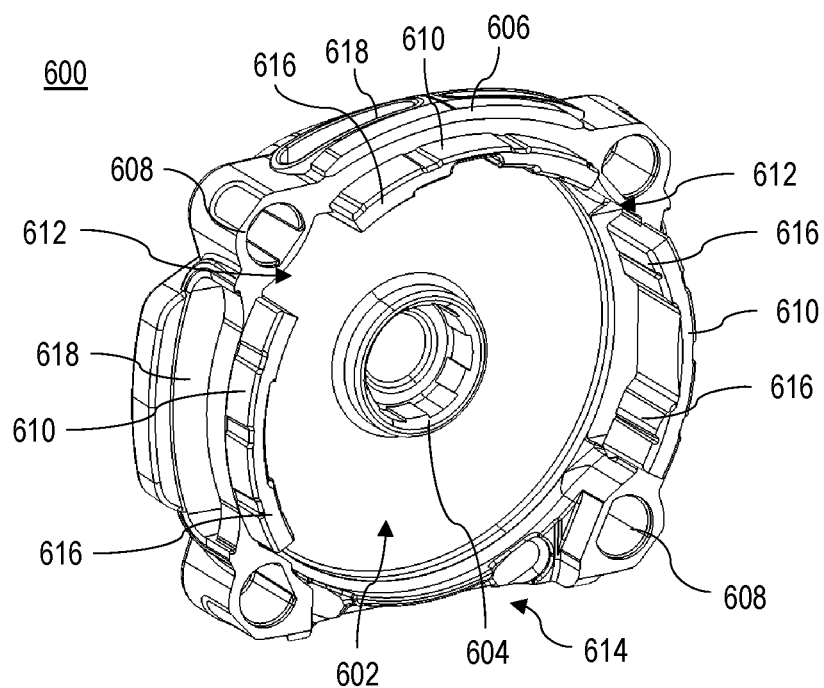
FIG. 34 depicts a perspective view of the rear tool cap, according to an embodiment.
Figure 35:
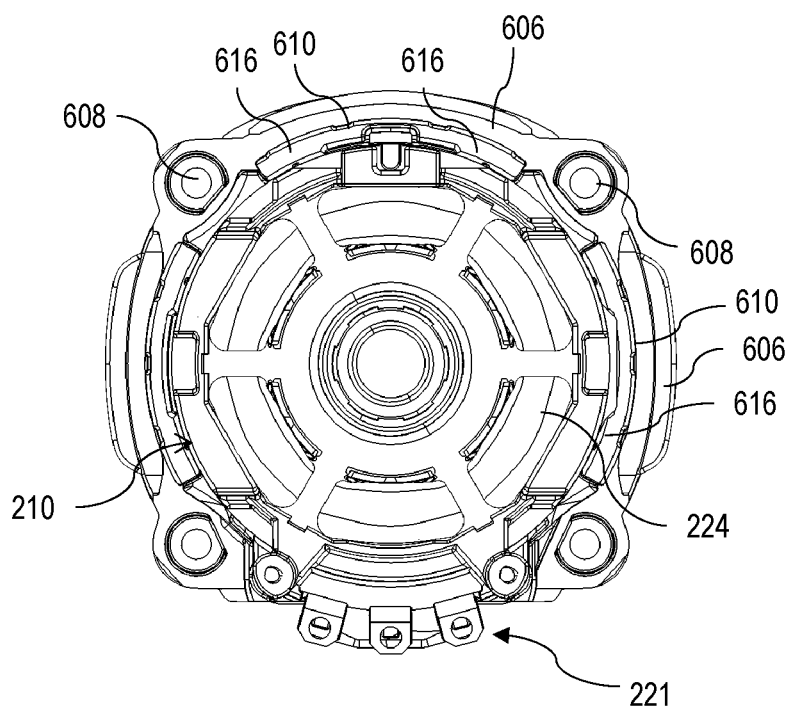
FIG. 35 depicts an axial view of the motor assembly received within the rear tool cap, according to an embodiment.
Figure 36:
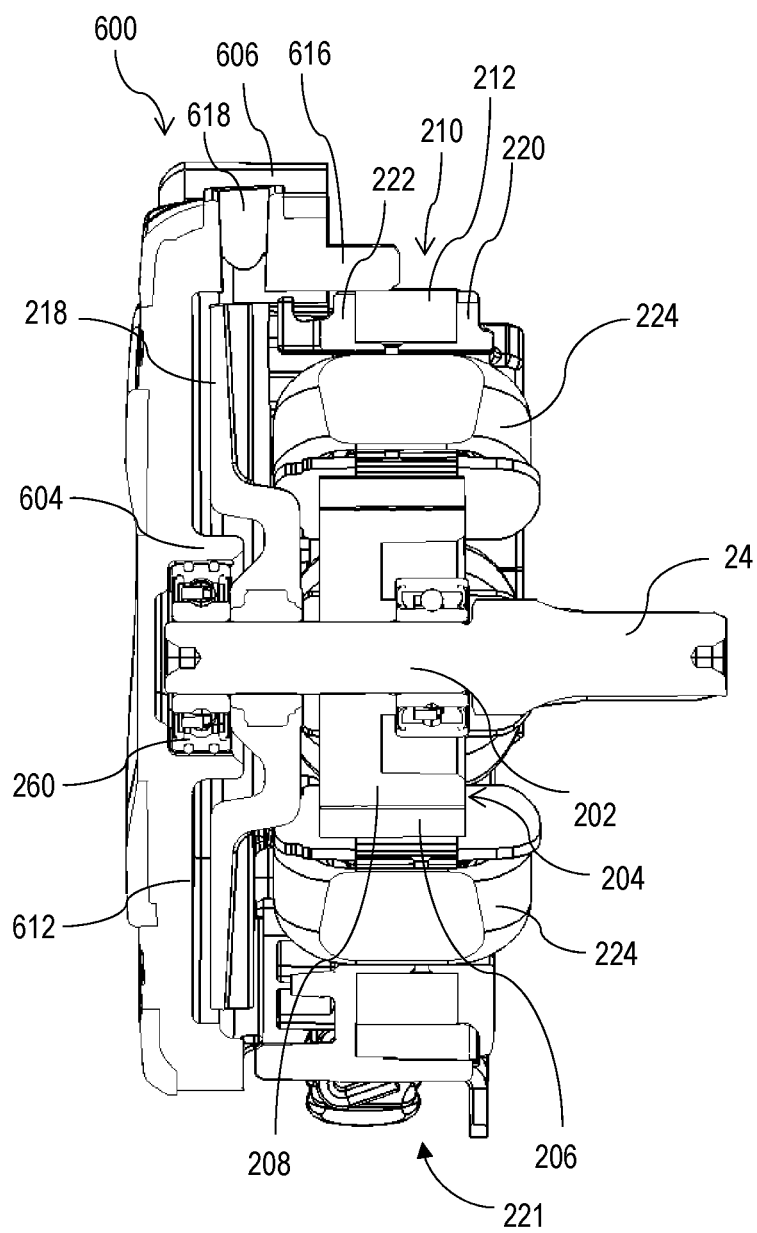
FIG. 36 depicts a side cross-sectional view of the motor assembly received within the rear tool cap, according to an embodiment.
Figure 37:
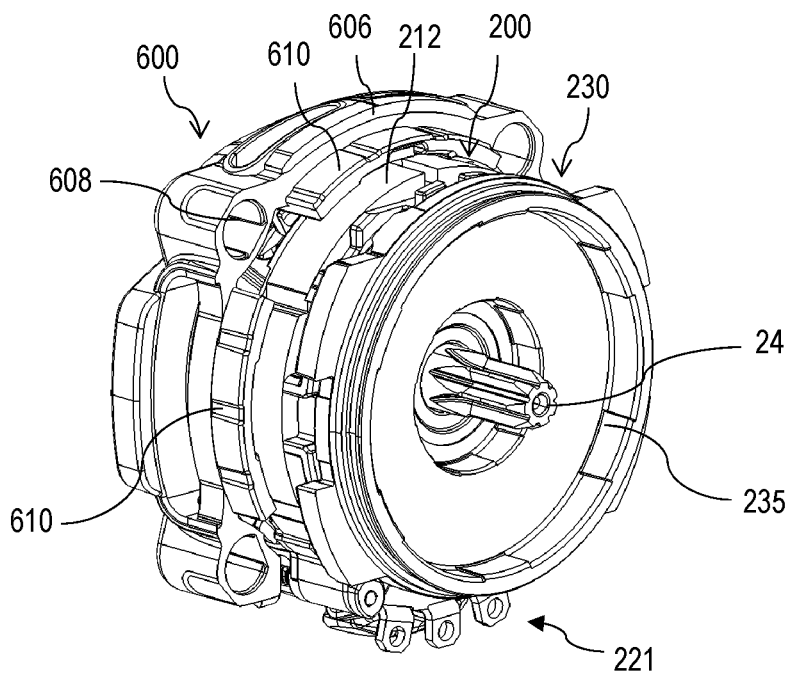
FIG. 37 depicts a frontal perspective view of the motor assembly received within the rear tool cap, according to an embodiment.
Figure 38:
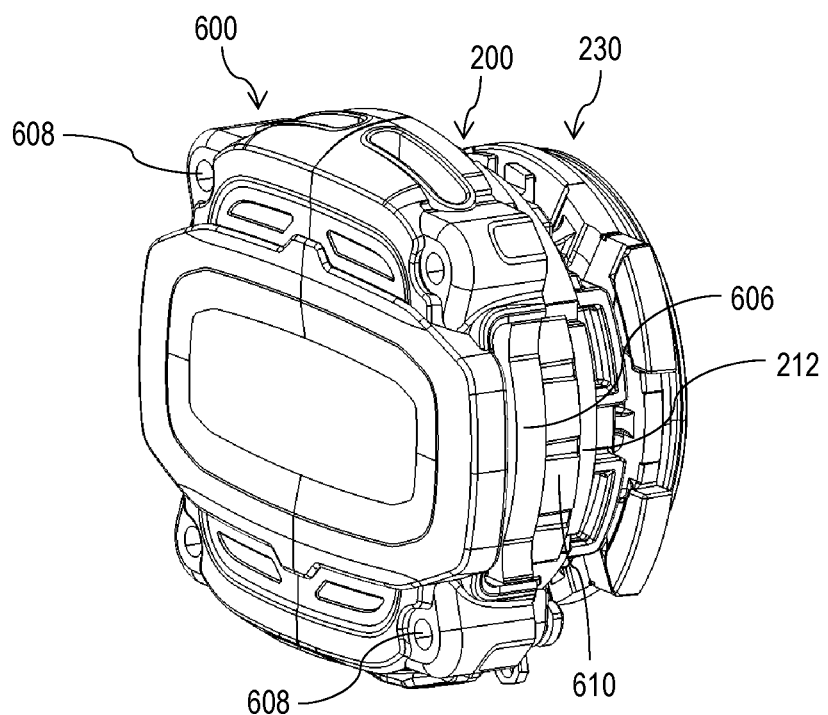
FIG. 38 depicts a rear perspective view of the motor assembly received within the rear tool cap, according to an embodiment.

FIG. 33 depicts a perspective partially exploded view an improved rear tool cap 600 provided for interfacing with the motor assembly 200, according to an embodiment. FIG. 34 depicts a perspective view of the rear tool cap 600, according to an embodiment. FIG. 35 depicts an axial view of the motor assembly 200 received within the rear tool cap 600, according to an embodiment. FIG. 36 depicts a side cross-sectional view of the motor assembly 200 received within the rear tool cap 600, according to an embodiment. FIGS. 37 and 38 depict two perspective views of the motor assembly 200 received within the rear tool cap 600, according to an embodiment.

As shown in these figures, in an embodiment, the rear tool cap 600 includes a radial body 602 that includes a central bearing pocket 604 for supporting the rear motor bearing 260, and a peripheral portion 606 that is secured to the tool housing 72. Peripheral portion 606 includes a series of receptacles 608 arranged to receive fasteners (not shown) for fastening the rear tool cap 600 to the power tool housing 72. In an embodiment, fan 218 is radially received within the peripheral portion 606.

Additionally, in an embodiment, rear tool cap 600 includes one or more constraining walls 610 projecting from the peripheral portion 606 around the longitudinal axis around the outer surface of the stator core 212. Constraining walls 610 are arcuately shaped along a circumference that has a slightly larger diameter than the outer surface of the stator core 212. In an embodiment, constraining walls 610 are discretely provided and extend peripherally equidistant from the central bearing pocket 604 along the circumference at least partially over the outer surface of the stator core 212. In an embodiment, the tuning pads 616 are circumferentially distanced from one another to define one or more circumferential gaps 612 in between. Alternatively, in an embodiment, a single cylindrical constraining wall 610 may be provided.

In an embodiment, each constraining wall 610 includes one or more tuning pads 616 on its inner surface in contact with the stator core 212. Tuning pads 616 cooperate to form-fittingly and securely receive the stator assembly 210 into the body of the rear tool cap 600. In an embodiment, inner surfaces of the tuning pads 616 are provided along a circumference that has a diameter substantially equal to the diameter of the outer surface of the stator core 212.

In an embodiment, the rear motor bearing 260 may be secured within the central motor bearing pocket 604 prior to assembly of the rotor 204 within the stator assembly 210. Since the tuning pads 616 secure the stator assembly 210 relative to the rear tool cap 600, once the rear motor bearing 260 is securely received within the central motor bearing pocket 604, the rear portion of the rotor shaft 202 is properly and accurately piloted relative to the stator assembly 210.

In an embodiment, a series of exhaust vents 618 are provided within the rear end cap 600 rearward of the constraining walls 610. Each exhaust vent 618 extends circumferentially along one side of the rear end cap 600 between the receptacles 608. Exhaust vents 618 are positioned around the fan 218 in fluid communication with the airflow generated by the fan 218 through the motor assembly 200. In an embodiment, fan 218 has a smaller diameter than the diameter of the stator core 212. The airflow generated by the fan 218 travels through the motor assembly 200 along generally the longitudinal axis of the motor and is expelled radially through the exhaust vents 618. In an embodiment, on a lower side of the rear end cap 600, instead of an exhaust vent, a lower opening 614 is provided that aligns with and receives the first connector 404 of the motor assembly 200.

In an embodiment, as best seen in FIGS. 36-38, the tuning pads 616 may extend along the outer surface of the stator assembly 210 from approximately half of the length of the stator core 212 up to nearly the full length of the stator assembly 210 to fully contain the stator assembly 210 within the rear tool cap 600. This allows the motor assembly 200 to be secured within the rear tool cap 600 prior to assembly of the rear tool cap 600 to the tool housing 72. In an embodiment, as shown in FIG. 32, the clamshells of the tool housing 72 may accordingly be sized to only cover less than half the length of the stator assembly 210.

This arrangement significantly eases the manufacturing process, as all transmission assembly 20 components can be assembled into the tool housing 72 prior to assembly of the rear tool cap 600 together with the motor assembly 200 and the support plate 230 into the tool housing 72. To complete this process, the motor assembly 200 may be coupled to the transmission assembly 20 by locating the cam carrier bearing 32 within the second bearing pocket 236 of the support plate 230 as the rear tool cap 600 is fastened to the clamshells of the tool housing 72. This arrangement, in combination with the features of the motor assembly 200 and support plate 230 discussed above, contributes to reduction in the overall length of the power tool 50.

Figure 39:
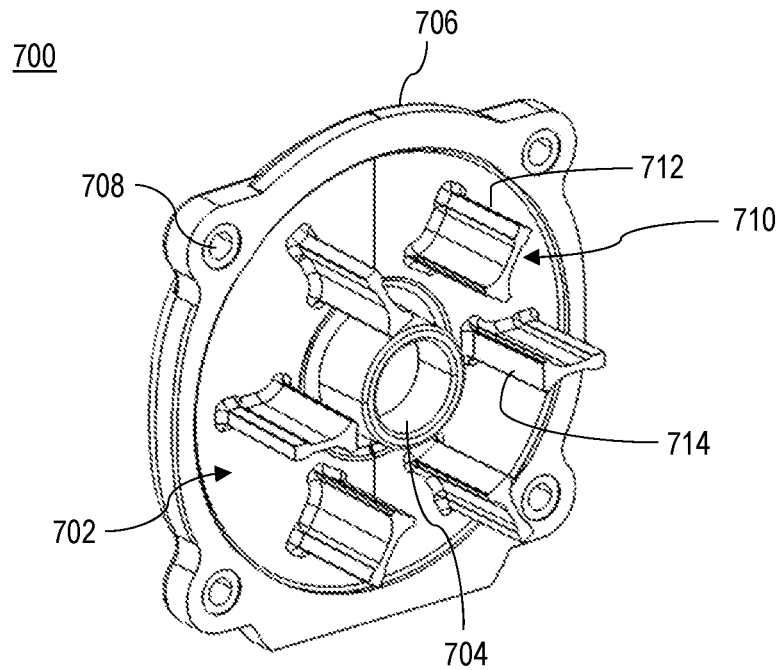
FIG. 39 depicts a perspective view of rear tool cap, according to an embodiment.
Figure 40:
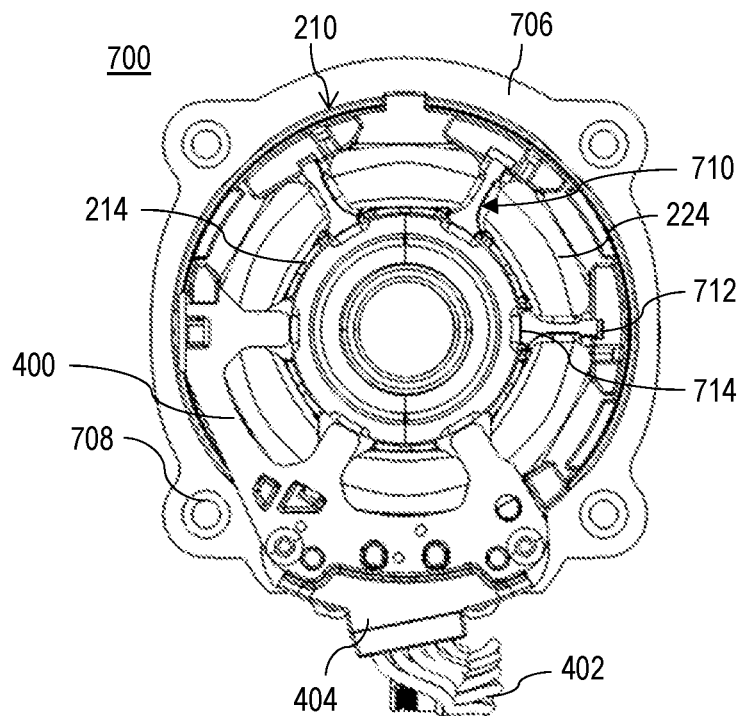
FIG. 40 depicts an axial view of the motor assembly mounted on the rear tool cap, according to an embodiment.
Figure 41:
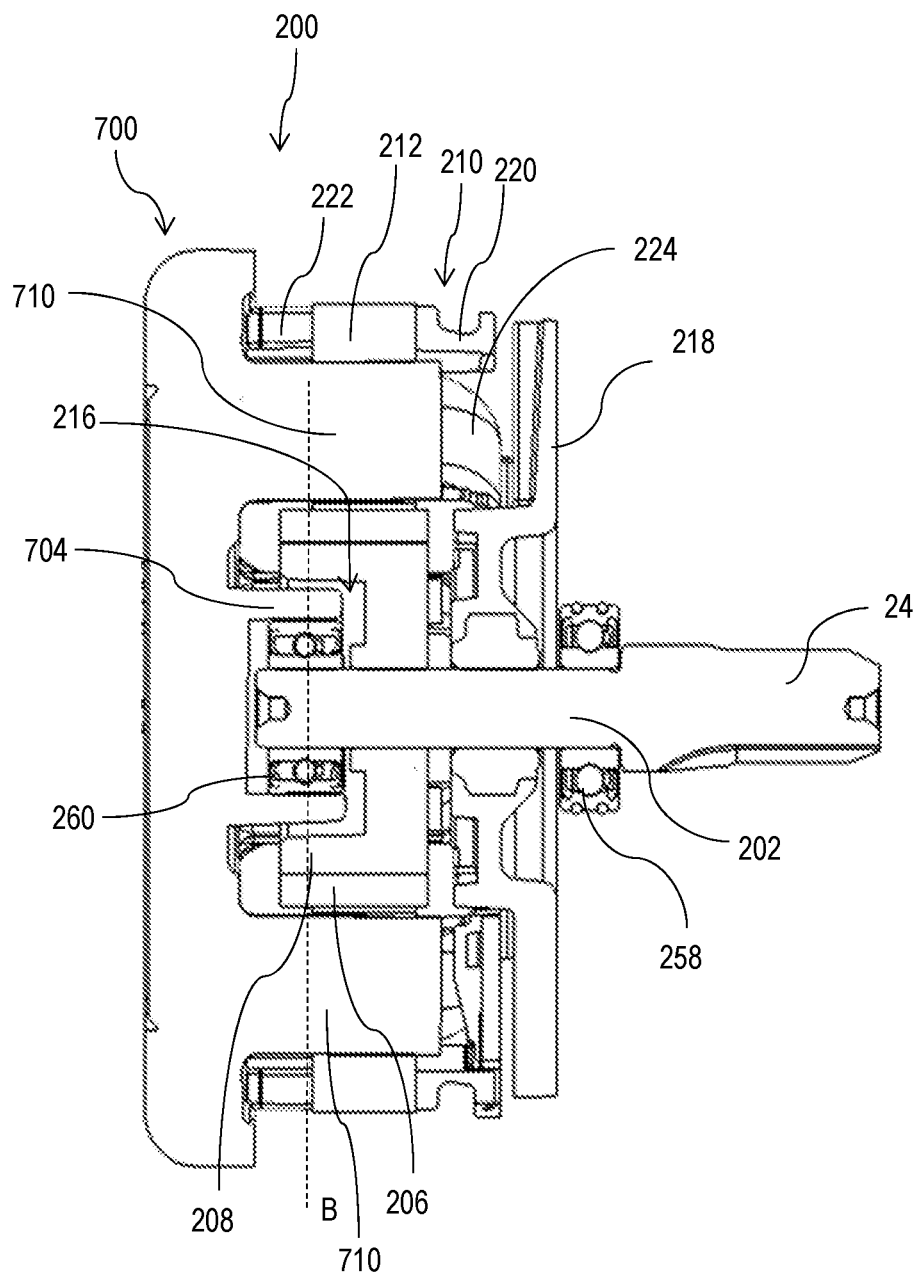
FIG. 41 depicts a side cross-sectional view of the motor assembly mounted on the rear tool cap, according to an embodiment.

Referring to FIGS. 39-41, an alternative rear tool cap 700 is described herein according to an embodiment.

FIG. 39 depicts a perspective view of rear tool cap 700, according to an embodiment. FIG. 40 depicts an axial view of the motor assembly 200 mounted on the rear tool cap 700, according to an embodiment. FIG. 41 depicts a side cross-sectional view of the motor assembly 200 mounted on the rear tool cap 700, according to an embodiment.

Similar to rear tool cap 600, the rear tool cap 700 of this embodiment includes a radial body 702 that includes a central bearing pocket 704 for supporting the rear motor bearing 260, and a peripheral portion 706 that is secured to the tool housing 72. Peripheral portion 706 includes a series of receptacles 708 arranged to receive fasteners (not shown) for fastening the rear tool cap 700 to the power tool housing 72. Unlike rear tool cap 600, however, in an embodiment, instead of circumferential turning pads disposed around the outer surface of the stator assembly 210, the rear tool cap 700 includes axial posts 702 projecting axially from the radial body 702 arranged to be received within the slots of the stator assembly 210 formed circumferentially between stator windings 224. Axial posts 702 are designed to penetrate the slots of the stator assembly 210 in contact with a portion of the stator core 212 and/or the stator teeth 214 to provide radial support for the rear tool cap 700, and therefore the central bearing pocket 704, relative to the stator assembly 210. In an embodiment, axial posts 720 extend through approximately the full length of the stator core 212.

In an embodiment, each axial post 702 may include an outer edge 712 and an outer edge 714 that is radially inward of the inner edge 712. In an embodiment, inner edges 712 are arranged to come into contact with the inner diameter of the stator core 212. Additionally, and/or alternatively, outer edges 714 are arranged to come into contact with adjacent tips of stator teeth 214. In this manner, the rear tool cap 700 is supported with respect to the stator assembly 210 independently of the power tool housing 72. Reference is once again made to US Patent Publication No. 2017/0294819A1, which is incorporated herein by reference in its entirety, for a description of the axial posts 710 for piloting and support of a bearing support structure such as the rear tool cap 700, and consequently the rotor 204, relative to the stator assembly 210. In an embodiment, a series of six axial posts 710 may be provided, though as little as three axial posts 710 can sufficiently support the rear tool cap 700 relative to the stator assembly 210.

In an embodiment, to accommodate insertion of the axial posts 710 into the stator slots, Hall board 400 may also be provided forward of the motor assembly 200 opposite the rear tool cap 700. Additionally, in an embodiment, the fan 218 is positioned forward of the motor assembly 200 between the Hall board 400 and the transmission assembly 20. In an embodiment, annular recess 216 of the rotor 204 is provided facing the rear tool cap 700 to receive the rear motor bearing 260 and central bearing pocket 704 of the rear tool cap 700 therein. In this embodiment, a radial plane B intersects at least a portion of the central bearing pocket 704, the magnet ring 206, the stator windings 224, and the axial posts 710.

In an embodiment, the rear motor bearing 260 may be secured within the central bearing pocket 704 of the rear tool cap 700 prior to assembly of the rotor 204 within the stator assembly 210. As the axial posts 710 are received relative to the stator slots, the rear portion of the rotor shaft 202, and thus the rotor 204 as a whole, is piloted relative to the stator assembly 210.

Each of the above described power tools is compact in both axial length and girth. For example, the impact power tools 10, 50 and 70 each may have an overall axial length L5, L6, L7 from the rear end portion of the housing 12, 52, 72 to a front end of the tool holder 28 of less than or equal to approximately 110 mm (e.g., approximately 96 mm to 110 mm, such as approximately 106 mm for power tool 10 or approximately 101 mm for power tools 50 and 70). In addition, an axial distance L2, L4 between the rear plate of the cam carrier 22 and the front plane 124, 244 of the motor envelope 120, 240 is less than approximately 10 mm (e.g., approximately 7 mm to 10 mm, such as approximately 9.1 mm for power tool 10) and may be less than approximately 4 mm (e.g., approximately 2 mm to 4 mm, such as approximately 3.1 mm for power tool 50).

At the same time, the above-described power tools 10, 50 and 70 are configured to produce a maximum power output (measured in Max Watts Out or MWO) of at least approximately 450 Watts (e.g., approximately 450 to 550 Watts, such as at least approximately 450 Watts or at least approximately 480 Watts). The above described power tools 10, 50 and 70 also can produce a maximum output torque of at least approximately 1800 inch-pounds (e.g., approximately 1800 to 2010 inch-pounds, such as at least approximately 1825 inch-pounds).

Thus, the above-described power tools 10, 50 and 70 produce much greater power and torque for their compact size than what is commercially available or has otherwise been achieved previously. For example, the above described power tools 10, 50 and 70 have a ratio of power output to tool length of at least approximately 4.5 Watts/mm (e.g., approximately 4.5 to 5.0 Watts/mm (e.g., approximately 4.5 Watts/mm (for power tool 10) or approximately 4.8 Watts/mm (for power tool 50)). The above described power tools 10, 50 and 70 also have a ratio output torque to tool length of at least approximately 18.0 inch-pounds/mm (e.g., approximately 18.0 inch-pounds/mm to 18.9 inch-pounds/mm, such as approximately 18.0 inch-pounds/mm (for power tool 10) or approximately 18.1 inch-pounds/mm (for power tool 50)). Other exemplary power tools within the scope of the above disclosure are set forth in the below table:

| | Motor Diameter (mm) | Motor Length (mm) | Max Power (Watts) | Max Torque (inch-pounds) | Tool Length (mm) | Power/ Tool Length | Torque/ Tool Length |
|---|---|---|---|---|---|---|---|
| Example 1 | 46 | 17 | 450 | 1825 | 96 | 4.7 | 19.0 |
| Example 2 | 51 | 18 | 480 | 1910 | 106 | 4.5 | 18.0 |
| Example 3 | 51 | 18 | 480 | 1825 | 101 | 4.8 | 18.1 |
| Example 4 | 56 | 20 | 528 | 2008 | 110 | 4.8 | 18.3 |

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A brushless direct-current (BLDC) motor, comprising:
a stator assembly including a stator core, a plurality of stator teeth radially extending from the stator core and defining a plurality of slots therebetween, and a plurality of stator windings wound around the plurality of stator teeth;
a rotor shaft extending along a longitudinal axis;
a rotor comprising a rotor core mounted on the rotor shaft, the rotor core supporting at least one permanent magnet that magnetically interacts with the plurality of stator windings to cause a rotation of the rotor relative to the stator assembly; and
a circuit board having a main body and at least one leg radially projecting from the main body to support at least one magnetic sensor in close proximity to the at least one permanent magnet, wherein the at least one leg is oriented along a radial plane that intersects the plurality of stator windings.

2. The BLDC motor of claim 1, wherein the stator assembly further includes an end insulator mounted on an end surface of the stator core to insulate the stator core from the plurality of stator windings, wherein the circuit board is mounted and fastened to the end insulator.

3. The BLDC motor of claim 2, wherein the circuit board at least three legs radially projecting from the main body to support three magnetic sensors, each leg extending between two adjacent stator windings in the direction of the rotor towards a center of the stator assembly.

4. The BLDC motor of claim 3, wherein each of the three magnetic sensors is substantially circumferentially aligned with inner portions of the plurality of stator windings.

5. The BLDC motor of claim 3, wherein the main body of the circuit board comprises a first portion that is curved and extends along the end of the stator assembly but does not extend peripherally beyond an outer surface of the stator core, and a second portion that extends peripherally beyond the outer surface of the stator core and through which at least one fastener is provided to secure the circuit board to the end insulator.

6. The BLDC motor of claim 5, further comprising a connector mounted on the second portion of the main body of the circuit board and a plurality of signal wires coupled to the connector.

7. The BLDC motor of claim 5, wherein the at least one fastener is peripherally provided beyond the outer surface of the stator core.

8. The BLDC motor of claim 5, further comprising a retention feature provided on the first portion of the main body of the circuit board and arranged to make a mechanical connection with a portion of the end insulator, wherein no portion of the retention feature projects from a rear surface of the circuit board in a direction opposite the stator core.

9. The BLDC motor of claim 5, wherein the second portion covers an angular distance in the range of approximately 60 degrees to 90 degrees.

10. The BLDC motor of claim 5, wherein the first portion is provided within a part of the main body of the circuit board that covers an angular distance in the range of approximately 35 degrees to 55 degrees.

11. The BLDC motor of claim 3, wherein inner tips of the three legs of the circuit board are circumferentially aligned with inner ends of the plurality of stator teeth.

12. The BLDC motor of claim 11, further comprising overmold or glue material arranged to secure the inner tips of the three legs of the circuit board to inner teeth portions of the end insulator.

13. A brushless direct-current (BLDC) motor, comprising:
a rotor shaft extending along a longitudinal axis;
a stator assembly including a stator core, a plurality of stator teeth radially extending from the stator core and defining a plurality of slots therebetween, a plurality of stator windings wound around the plurality of stator teeth, and an end insulator mounted on an end surface of the stator core to insulate the stator core from the plurality of stator windings, the end insulator having a radial body and a retention post projecting from the radial body;
a rotor comprising a rotor core mounted on the rotor shaft, the rotor core supporting at least one permanent magnet that magnetically interacts with the plurality of stator windings to cause a rotation of the rotor relative to the stator assembly;
a circuit board mounted to the end insulator, the circuit board including a front surface facing the end insulator, a rear face, and at least one magnetic sensor mounted on the front face and configured to generate a signal associated with an angular position of the rotor; and
a retention feature provided on a front surface of the circuit board facing the stator core and arranged to make a mechanical connection with the retention post of the end insulator, wherein no portion of retention post of the end insulator or the retention feature projects substantially over the rear surface of the circuit board.

14. The BLDC motor of claim 13, wherein the circuit board includes an arcuate main body and at least one leg projecting radially inwardly from the main body to support at least one magnetic sensor in close proximity to the at least one permanent magnet, wherein the at least one leg is oriented along a radial plane that intersects the plurality of stator windings.

15. The BLDC motor of claim 13, wherein the retention post comprises a snap head and the circuit board comprises a slot arranged to receive the snap head of the retention post, wherein the snap head does not substantially project out of the slot over the rear surface of the circuit board.

16. The BLDC motor of claim 15, wherein the retention feature comprises an overmold layer formed on the front surface of the circuit board facing the stator core, wherein the overmold layer forms a lip arranged at a distance from the front surface of the circuit board and configured to make a snap-fit connection with the snap head of the retention post.

17. The BLDC motor of claim 15, wherein the retention feature comprises a metal trap including two legs mounted on the front surface of the circuit board and a main body distanced from the front face of the circuit board partially overlapping the slot of the circuit board, the main body being configured to make a snap-fit connection with the snap head of the retention post.

18. The BLDC motor of claim 15, further comprising a place pad having a planar body mounted on the front face of the circuit board, the place pad comprising at least one snap projecting from the planar body overlapping the slot of the circuit board, the at least one snap being resiliently flexible to make a snap-fit connection with the retention post.

19. The BLDC motor of claim 13, wherein the retention post comprises a recess and the retention feature comprises a clip disposed on the front surface of the circuit board, the retention feature having an engagement edge extending from an edge of the circuit board that is received within the recess of the retention post.

20. A power tool comprising:
a tool housing; and
a brushless direct-current (BLDC) motor according to claim 13 received within the housing.

* * * * *